(12) United States Patent
Jones et al.

(10) Patent No.: US 10,121,179 B2
(45) Date of Patent: *Nov. 6, 2018

(54) METHODS AND SYSTEMS OF MAKING AN ARTICLE OF FOOTWEAR

(71) Applicant: NIKE, Inc., Beaverton, OR (US)

(72) Inventors: David P. Jones, Beaverton, OR (US); Bruce J. Kilgore, Lake Oswego, OR (US); Elizabeth Langvin, Sherwood, OR (US); James C. Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 388 days.

This patent is subject to a terminal disclaimer.

(21) Appl. No.: 15/097,476

(22) Filed: Apr. 13, 2016

(65) Prior Publication Data

US 2016/0225052 A1 Aug. 4, 2016

Related U.S. Application Data

(60) Continuation of application No. 14/230,097, filed on Mar. 31, 2014, now Pat. No. 9,332,809, which is a (Continued)

(51) Int. Cl.
*G06F 19/00* (2018.01)
*G06Q 30/06* (2012.01)
(Continued)

(52) U.S. Cl.
CPC ....... *G06Q 30/0621* (2013.01); *A43B 1/0054* (2013.01); *A43B 3/0036* (2013.01);
(Continued)

(58) Field of Classification Search
CPC ............................ G06Q 30/0621; A43D 8/22
(Continued)

(56) References Cited

U.S. PATENT DOCUMENTS

| 2,055,234 | A | 9/1936 | Howe, Jr. |
| 5,206,804 | A | 4/1993 | Thies et al. |

(Continued)

FOREIGN PATENT DOCUMENTS

| CN | 101588736 | 11/2009 |
| EP | 2094122 | 9/2009 |

(Continued)

OTHER PUBLICATIONS

International Search Report and Written Opinion dated Jan. 16, 2009 in International Application No. PCT/US2007/087880.
(Continued)

*Primary Examiner* — Mohammad Ali
*Assistant Examiner* — Sheela S Rao
(74) *Attorney, Agent, or Firm* — Banner & Witcoff, Ltd.

(57) ABSTRACT

A method of making an article of footwear is disclosed. The method includes the steps of designing an article of footwear via a website, converting a footwear representation into a set of two-dimensional portions, printing the two dimensional portions onto a sheet material, cutting and assembling the two dimensional portions into a finalized article of footwear. The method further includes a step of shipping the article of footwear to a pre-designated shipping address. Systems for receiving an order for a customized article of footwear are also disclosed.

20 Claims, 14 Drawing Sheets

Related U.S. Application Data continuation of application No. 13/616,762, filed on Sep. 14, 2012, now Pat. No. 8,731,696, which is a division of application No. 13/053,445, filed on Mar. 22, 2011, now Pat. No. 8,295,962, which is a division of application No. 11/612,320, filed on Dec. 18, 2006, now Pat. No. 7,945,343.

(51) Int. Cl.
| | | |
|---|---|---|
| *A43B 3/00* | (2006.01) | |
| *A43B 1/00* | (2006.01) | |
| *A43B 9/00* | (2006.01) | |
| *A43D 999/00* | (2006.01) | |
| *G06Q 10/04* | (2012.01) | |
| *A43D 8/30* | (2006.01) | |
| *A43D 8/16* | (2006.01) | |
| *A43D 111/00* | (2006.01) | |
| *A43D 8/22* | (2006.01) | |

(52) U.S. Cl.
CPC .......... *A43B 3/0078* (2013.01); *A43B 3/0084* (2013.01); *A43B 3/0089* (2013.01); *A43B 9/00* (2013.01); *A43D 8/16* (2013.01); *A43D 8/22* (2013.01); *A43D 8/30* (2013.01); *A43D 111/00* (2013.01); *A43D 999/00* (2013.01); *G06Q 10/043* (2013.01); *G06Q 30/0643* (2013.01); *A43D 2200/00* (2013.01); *A43D 2200/60* (2013.01)

(58) Field of Classification Search
USPC ...... 36/100, 1.5, 15, 7.3; 345/419, 420, 619; 700/95–98
See application file for complete search history.

(56) References Cited

U.S. PATENT DOCUMENTS

| | | | |
|---|---|---|---|
| 5,255,352 | A | 10/1993 | Falk |
| 5,662,566 | A | 9/1997 | Marxrieser et al. |
| 6,299,962 | B1 | 10/2001 | Davis et al. |
| 6,434,870 | B1 | 8/2002 | Fanjoy |
| 6,449,878 | B1 | 9/2002 | Lyden |
| 6,533,885 | B2 | 3/2003 | Davis et al. |
| 6,601,042 | B1 | 7/2003 | Lyden |
| 6,859,679 | B1 | 2/2005 | Smith et al. |
| 6,868,303 | B1 | 3/2005 | Chabirand Garconnet et al. |
| 6,954,998 | B1 | 10/2005 | Lussier |
| 7,016,867 | B2 | 3/2006 | Lyden |
| 7,089,691 | B1 | 8/2006 | Silvera |
| 7,118,643 | B1 | 10/2006 | Mellet et al. |
| 7,945,343 | B2 | 5/2011 | Jones et al. |
| 8,295,962 | B2 | 10/2012 | Jones et al. |
| 8,612,039 | B2 | 12/2013 | Jones et al. |
| 8,731,696 | B2 | 5/2014 | Jones et al. |
| 9,282,788 | B2 | 3/2016 | Jones et al. |
| 9,332,809 | B2 | 5/2016 | Jones et al. |
| 2003/0033207 | A1 | 2/2003 | Litke et al. |
| 2003/0069807 | A1 | 4/2003 | Lyden |
| 2004/0024645 | A1 | 2/2004 | Potter et al. |
| 2005/0071242 | A1 | 3/2005 | Allen et al. |
| 2005/0131571 | A1 | 6/2005 | Costin |
| 2005/0251462 | A1 | 11/2005 | Nykamp |
| 2005/0289018 | A1 | 12/2005 | Sullivan et al. |
| 2006/0101671 | A1 | 5/2006 | Berend et al. |
| 2006/0111976 | A1 | 5/2006 | Pompushko |
| 2007/0000589 | A1 | 1/2007 | Mellet et al. |
| 2007/0130805 | A1 | 6/2007 | Brady et al. |
| 2008/0126981 | A1 | 5/2008 | Candrian et al. |
| 2008/0147219 | A1 | 6/2008 | Jones et al. |
| 2011/0172797 | A1 | 7/2011 | Jones et al. |

FOREIGN PATENT DOCUMENTS

| | | |
|---|---|---|
| EP | 2094122 B1 | 5/2013 |
| EP | 2622980 A1 | 8/2013 |
| EP | 2625979 A1 | 8/2013 |
| EP | 2625979 B1 | 4/2016 |
| JP | 2003108795 | 4/2003 |
| WO | 0036943 | 6/2000 |
| WO | 2007142824 | 12/2007 |
| WO | 2008077014 | 6/2008 |

OTHER PUBLICATIONS

Chinese Office Action dated Jun. 5, 2012 in Chinese Application No. 200780046774.6, and English translation thereof.
Extended European Search Report dated Jun. 13, 2012 in European Patent Application No. 07865789.7.
International Preliminary Report on Patentability (including Written Opinion of the ISA) dated Jul. 2, 2009, in International Application No. PCT/US2007/087880.
Response to Correct the Deficiencies in the European Search Opinion filed on Sep. 5, 2012 in European Patent Application No. 07865789.7.
Chinese Office Action dated Mar. 8, 2013 in Chinese Patent Application No. 200780046774.6 and English translation thereof.
Notice of Intention to Grant dated Dec. 5, 2012 in European Patent Application No. 07865789.7.
Response to Chinese Office Action filed May 15, 2013 in Chinese Patent Application No. 200780046774.6.
Extended European Search Report dated Jul. 8, 2013 in European Patent Application No. 13164118.5.
Extended European Search Report dated Jul. 15, 2013 in European Patent Application No. 13164117.7.
Chinese Office Action dated Aug. 26, 2013 in Chinese Patent Application No. 200780046774.6 and English translation thereof.
European Office Action dated Apr. 17, 2014 in European Patent Application No. 13164117.7.
Response filed Oct. 1, 2013 in European Patent Application No. 13164117.7.
Response filed Aug. 12, 2014 in European Patent Application No. 13164117.7.
Intention to Grant dated Oct. 8, 2015 in European Patent Application No. 13164117.7.
Response filed Sep. 9, 2013 in European Patent Application No. 13164118.5.
Office Action dated Oct. 2, 2015 in U.S. Appl. No. 14/797,606.
Response filed Oct. 29, 2013 in Chinese Application No. 200780046774.6.
Notification of the Decision to Grant dated Jan. 26, 2014 for Chinese Office Action for Chinese Application No. 200780046774.6, and English translation thereof.

METHODS AND SYSTEMS OF MAKING AN ARTICLE OF FOOTWEAR

This application is continuation of U.S. Patent Publication Number US2014/0289976, published Oct. 2, 2014 (U.S. patent application Ser. No. 14/230,097, filed Mar. 31, 2014), which is a continuation of U.S. Pat. No. 8,731,696, issued May 20, 2014 (U.S. patent application Ser. No. 13/616,762, filed Sep. 14, 2012), which is a division of U.S. Pat. No. 8,295,962, issued Oct. 23, 2012 (U.S. patent application Ser. No. 13/053,445, filed Mar. 22, 2011), which is a division of U.S. Pat. No. 7,945,343, issued May 17, 2011 (U.S. patent application Ser. No. 11/612,320, filed Dec. 18, 2006), all of which are herein incorporated by reference in their entirety.

BACKGROUND

1. Field

The present invention relates generally to articles of footwear and in particular to a method of making an article of footwear.

2. Description of Related Art

Customization systems for some types of apparel have been previously proposed. Usually, designs may be applied to t-shirts. In some cases, apparel such as jeans may be modified and custom designed. Sometimes, the system through which the customer designs and orders the apparel may be the Internet.

Sullivan (U.S. patent number 2005/0289018) discloses an online personal apparel design and sales technology with associated technology and fulfillment techniques and processes. Sullivan teaches methods for customized and personalized design of apparel. The most common type of apparel taught by Sullivan includes various types of shirts and t-shirts. Generally, Sullivan teaches a system for customization, but does not disclose detailed processes by which the customized apparel is produced.

Costin (U.S. patent number 2005/0131571) teaches an Internet customization of apparel. Specifically, Costin teaches an Internet based technique of allowing customization of denim apparel over the Internet. Costin uses a laser device that etches designs and patterns into denim apparel. Generally, techniques of applying intricate images and graphics involving multiple colors are not disclosed.

Allen et al. (U.S. patent number 2005/0071242) discloses a method and system for custom-manufacturing footwear. This system and method may allow a retailer to control the selection of choices given to the customer for custom-manufacturing the footwear. Generally, however, the method of Allen lacks provisions for allowing for a full range of graphical designs and modifications to customize an article of footwear. In the method of Allen, the designs of the article of footwear are pre-determined by the manufacturer, allowing the user the option of selecting between designs and in some cases, various colors for the designs. There is no feature, for example, allowing a user to add a customized image of their choosing to an article of footwear.

Articles of footwear that may be designed by printing along a two-dimensional portion of an article of footwear have also been proposed. Davis et al. (U.S. Pat. No. 6,299,962) teaches an invention directed to an article of footwear and a method of making the same, where the article of footwear has a minimum number of upper pieces. In the method of Davis, the outer layer of the upper is molded using an embossing tool. Additionally, the outer layer may be decorated by screen printing, sublimation, large format ink jet printing, cold and hot peel transfers, as well as other means. Generally, however, the method of Davis is limited to printing only a single portion of an upper.

While the related art teaches various methods for customizing apparel, there are many shortcomings. Generally, the automated methods used for producing customized apparel based on customized designs lack provisions for applying customized designs to objects with curved surfaces. Specifically, the methods used for producing customized t-shirts, which are themselves flat and two-dimensional, are not appropriate for articles of footwear that include many curved surfaces.

Additionally, the article of footwear disclosed in the prior art lacks customization and variability in the footwear portions that may be modified using a printer or other similar devices. There is therefore a need in the art for a customization system directed at articles of footwear including steps for customizing the article of footwear as well as steps for manufacturing the customized article of footwear.

SUMMARY

A method of making an article of footwear is disclosed. In one aspect, the invention provides a method of customizing an article of footwear, comprising the steps of: providing a graphical interface system for designing a three-dimensional footwear representation; receiving a design including a customized three-dimensional footwear representation; converting the customized three-dimensional footwear representation into at least one two-dimensional portion; printing the two-dimensional portion onto a sheet material; cutting the sheet material into at least one portion of the article of footwear; assembling the at least one portion into a finalized article of footwear; and shipping the finalized article of footwear to a pre-designated shipping address.

In another aspect, the graphical interface system includes a set of graphics tools.

In another aspect, the graphical interface system includes a text tool.

In another aspect, the graphical interface system includes a stripe tool.

In another aspect, the sheet material is a stock material.

In another aspect, the two-dimensional portion is printed onto the sheet material with an ink jet printer.

In another aspect, the invention provides a method for ordering a customized article of footwear, comprising the steps of: interacting with a graphical interface system; modifying a three-dimensional footwear representation; selecting a current graphics tool from a set of graphics tools; using the current graphics tool to modify a customer selected portion; and submitting a finalized design including a customized footwear representation, and ordering the article of footwear.

In another aspect, text may be applied to the footwear representation using a text tool.

In another aspect, the view of the footwear representation may be modified using a directional tool.

In another aspect, the footwear representation may be translated using the directional tool.

In another aspect, the footwear representation may be rotated using the directional tool.

In another aspect, the step of modifying the three-dimensional footwear representation includes a step of applying an image to the three-dimensional footwear representation.

In another aspect, the image is a digital photo.

In another aspect, the invention provides a method for producing a customized article of footwear, comprising the steps of: providing a graphical interface system; providing a set of graphics tools; receiving information related to a customized footwear representation; and producing a customized article of footwear based on the customized footwear representation.

In another aspect, the graphical interface system is accessible via a network.

In another aspect, the network is the Internet.

In another aspect, the step of producing the article of footwear includes a step of printing a portion of the customized footwear representation.

In another aspect, the portion is a two-dimensional portion.

In another aspect, the two-dimensional portion is printed onto a sheet material.

In another aspect, a protective coating is applied to the sheet material after the printing step.

In another aspect, the invention provides a method for producing a customized article of footwear, comprising the steps of: receiving a customized footwear representation from a customer; converting the customized footwear representation into at least one two-dimensional portion; printing a graphical design corresponding to the at least one two-dimensional portion onto a sheet material; cutting at least one portion of the sheet material corresponding to the at least one portion of the converted two-dimensional portions; and assembling the at least one portion into a finalized article of footwear.

In another aspect, the step of receiving the customized footwear representation from a customer includes the step of accessing the Internet.

In another aspect, the step of converting the customized footwear representation into two or more two-dimensional portions includes a step of optimizing the layout of the two-dimensional portions.

In another aspect, the sheet material is a stock material.

In another aspect, the step of printing the graphical design includes a step of applying a protective coating to the sheet material.

In another aspect, the assembled article of footwear is shipped to a pre-designated shipping address.

In another aspect, the step of printing onto the sheet material includes a step of printing a label for the at least one two-dimensional portion.

In another aspect, the step of converting the three-dimensional footwear representation includes a step of converting the three-dimensional footwear representation into a first two-dimensional portion and a second two-dimensional portion.

In another aspect, the step of printing includes a step of printing a first graphical design to the first two-dimensional portion and a second graphical design to the second two-dimensional portion along the sheet material.

In another aspect, the step of cutting includes a step of cutting the first two-dimensional portion and the second two-dimensional portion.

In another aspect, the step of assembling includes a step of assembling the first two-dimensional portion and the second two-dimensional portion into the finalized article of footwear.

In another aspect, the invention provides a method of ordering an article of footwear with a custom designated image, comprising the steps of: incorporating a custom designated image into a graphical interface system; associating a footwear representation with the custom designated image; submitting a customized footwear representation including a custom designated image and ordering the article of footwear.

In another aspect, the custom designated image is submitted via a network.

In another aspect, the network is the Internet.

In another aspect, the graphical interface system includes a set of graphics tools.

In another aspect, the set of graphics tools includes a text tool.

In another aspect, the custom designated image is a photo.

In another aspect, the step of submitting a custom designated image includes a step of downloading an image from the Internet.

In another aspect, the invention provides a method of producing an article of footwear with a custom designated image, comprising the steps of: receiving a customized footwear representation including a custom designated image; and producing the article of footwear based on the customized footwear representation that includes the custom designated image.

In another aspect, the step of receiving a custom designated image includes a step of accessing a network.

In another aspect, the network is the Internet.

In another aspect, the step of producing the article of footwear includes a step of converting a portion of the customized footwear representation including the custom designated image to a two-dimensional portion.

In another aspect, the two-dimensional portion is printed on a sheet material.

In another aspect, the sheet material is a stock material.

In another aspect, a second custom designated image is incorporated.

In another aspect, the invention provides a method of minimizing the total area of a sheet material used to manufacture a customized article of footwear, comprising the steps of: dividing a three-dimensional footwear representation into a first two two-dimensional portion and a second two-dimensional portion; optimizing a layout of the two-dimensional portions; and applying the optimized layout of the first two-dimensional portion and the second two-dimensional portion to a sheet material.

In another aspect, the three-dimensional footwear representation is divided into three two-dimensional portions.

In another aspect, the three-dimensional footwear representation is divided into more than three two-dimensional portions.

In another aspect, the step of optimizing a layout of the two-dimensional portions includes a step of minimizing the area disposed between the two-dimensional portions along a two-dimensional surface.

In another aspect, the sheet material is a stock material.

In another aspect, the invention provides a method of customizing a pair of complementary articles of footwear, comprising the steps of: providing a graphical interface system for designing a three-dimensional footwear representation; receiving a design including a customized three-dimensional footwear representation; associating the customized three-dimensional footwear representation with a first article of footwear; including an option within the graphical interface system for duplicating the customized three-dimensional footwear representation to be associated with a second article of footwear that is complementary to the first article of footwear; and producing a pair of complementary articles of footwear.

In another aspect, the option is a button.

In another aspect, the graphical interface system includes a set of graphics tools.

In another aspect, the set of graphics tools includes a text tool.

In another aspect, the set of graphics tools includes a stripe tool.

In another aspect, the graphical interface system includes a directional tool.

In another aspect, the invention provides a method of customizing a pair of complementary articles of footwear, comprising the steps of: providing a graphical interface system for designing a first three-dimensional footwear representation and a second three-dimensional footwear representation; receiving a design including a first customized three-dimensional footwear representation and a second customized three-dimensional footwear representation; associating the first customized three-dimensional footwear representation with a first article of footwear and the second customized three-dimensional footwear representation with a second article of footwear that is complementary to the first; and producing a pair of complementary articles of footwear.

In another aspect, the first article of footwear is substantially similar to the second article of footwear.

In another aspect, the first article of footwear is substantially dissimilar to the second article of footwear.

In another aspect, the graphical interface system includes a set of graphics tools.

In another aspect, the set of graphics tools includes a text tool.

In another aspect, the set of graphics tools includes a stripe tool.

In another aspect, the invention provides a method of minimizing the total area of a sheet material used to manufacture an article of footwear, comprising the steps of: dividing a design for an article of footwear into a first two-dimensional portion and a second two-dimensional portion; optimizing a layout of the two-dimensional portions; and applying the optimized layout of the first two-dimensional portion and the second two-dimensional portion to a sheet material.

In another aspect, the design for the article of footwear is divided into three two-dimensional portions.

In another aspect, the design for the article of footwear is divided into more than three two-dimensional portions.

In another aspect, the step of optimizing a layout of the two-dimensional portions includes a step of minimizing the area disposed between the two-dimensional portions along a two-dimensional surface.

In another aspect, the sheet material is a stock material.

In another aspect, the invention provides a method of minimizing the total area of a sheet material used to manufacture a complementary pair of footwear, comprising the steps of: dividing a first design for a first article of footwear into a first two-dimensional portion and a second two-dimensional portion; dividing a second design for a second article of footwear that is complementary to the first into a third two-dimensional portion and a fourth two-dimensional portion; optimizing the layout of the first two-dimensional portion, the second two-dimensional portion, the third two-dimensional portion and the fourth two-dimensional portion; and applying the optimized layout of the first two-dimensional portion, the second two-dimensional portion, the third two-dimensional portion and the fourth two-dimensional portion to a sheet material.

In another aspect, the first design for the first article of footwear is divided into more than two portions.

In another aspect, the second design for the second article of footwear is divided into more than two portions.

In another aspect, the sheet material is a stock material.

In another aspect, the first design and the second design are customized designs.

In another aspect, the invention provides a method for producing an article of footwear, comprising the steps of: receiving a design for an article of footwear; converting the design for the article of footwear into at least one two-dimensional portion; printing a graphical design corresponding to the at least one two-dimensional portion onto a sheet material; applying a protective film to the sheet material; cutting at least one portion of the sheet material corresponding to the at least one portion of the converted two-dimensional portions; and assembling the at least one portion into a finalized article of footwear.

In another aspect, the protective film is a clear coating.

In another aspect, the protective film is a plastic film.

In another aspect, the protective film is applied to only a portion of the sheet material.

In another aspect, the sheet material is a stock material.

In another aspect, the printer is any digital printer.

In another aspect, the invention provides a method for producing an article of footwear, comprising the steps of: receiving a design for an article of footwear; converting the design for the article of footwear into at least one two-dimensional portion, the at least one two-dimensional portion being associated with a first region of the article of footwear; printing a graphical design corresponding to the at least one two-dimensional portion onto a sheet material and a label associated with the first region; cutting at least one portion of the sheet material corresponding to the at least one portion of the converted two-dimensional portions; and assembling the at least one portion into a finalized article of footwear.

In another aspect, the design is converted into multiple two-dimensional portions.

In another aspect, the multiple two-dimensional portions are associated with a region of the article of footwear.

In another aspect, the multiple two-dimensional portions are printed onto a sheet material.

In another aspect, a label is printed and associated with each of the two-dimensional portions.

In another aspect, each of the two-dimensional portions is cut from the sheet material.

In another aspect, the article of footwear is assembled from the multiple two-dimensional portions.

In another aspect, the sheet material is a stock material.

In another aspect, the invention provides a method for producing a customized article of footwear, comprising the steps of: receiving a customized footwear representation from a customer; converting the customized footwear representation into a set of two-dimensional portions, the set including at least one two-dimensional portion; associating each two-dimensional portion with a portion of a sheet material; printing inside the entire area of each portion of the sheet material; cutting each portion of the sheet material corresponding to set of converted two-dimensional portions; and assembling the portions into a finalized article of footwear.

In another aspect, the set of two-dimensional portions includes multiple two-dimensional portions.

In another aspect, each two-dimensional portion is printed to a transfer film.

In another aspect, the transfer film comprises a layer of polyurethane.

In another aspect, the sheet material is leather.

In another aspect, the sheet material is felt.

In another aspect, the invention provides a method for producing a customized article of footwear, comprising the steps of: receiving a customized footwear representation from a customer; converting the customized footwear representation into at least one two-dimensional portion; printing the reverse image of a graphical design corresponding to the at least one two-dimensional portion onto a transfer film; attaching the transfer film with a sheet material using a press; cutting at least one portion of the sheet material corresponding to the at least one portion of the converted two-dimensional portions; and assembling the at least one portion into a finalized article of footwear.

In another aspect, the transfer film comprises a layer of polyurethane.

In another aspect, a release paper is associated with the transfer film.

In another aspect, a texture is applied to the sheet material.

In another aspect, the texture is applied using an embossing roll.

In another aspect, the sheet material is leather.

In another aspect, the sheet material is felt.

In another aspect, the sheet material is a synthetic leather.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
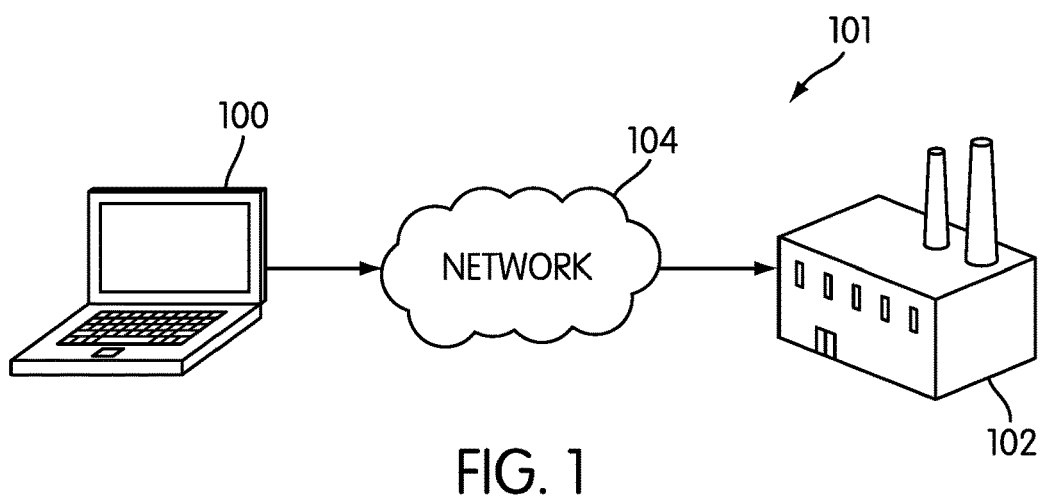
FIG. 1 is a preferred embodiment of a customization system.

FIG. 1 is a schematic diagram of an illustrative embodiment of customization system 101. The term customization system, as used throughout this detailed description, preferably refers to a system for manufacturing articles of footwear through the production of easily customizable portions of an article of footwear. In some embodiments, these portions may be customized by the manufacturer or a third party designer. In a preferred embodiment, the portions may be customized by the party purchasing the articles of footwear.

In a preferred embodiment, customization system 101 comprises a remote terminal 100 connected to factory 102 by way of network 104. Generally, remote terminal 100 may be any type of computer, including either a desktop or a laptop computer. In other embodiments, remote terminal 100 may be any type of device that includes a display, a processor, and the ability to transmit and receive data from a remote network. Examples of such devices include, but are not limited to, PDAs, cell phones, as well as other types of devices.

In this embodiment, factory 102 represents a manufacturing system configured to manufacture articles of footwear. Here, factory 102 is shown as a single building for illustrative purposes only. In many cases, factory 102 will comprise many buildings. In some cases, factory 102 may comprise many buildings that are disposed in different geographic locations. Generally, the term factory, as used here, may also refer to distributors and/or suppliers. In other words, the term factory may also apply to various operations on the manufacturing side, including the operations responsible for parts, labor, and/or retail of the article of footwear, as well as other manufacturing side operations.

Preferably, network 104 is configured to relay information between computer 100 and factory 102. Generally, network 104 may be a system allowing for the exchange of information between computer 100 and factory 102. Examples of such networks include, but are not limited to, personal area networks, local area networks, wide area networks, client-server networks, peer-to-peer networks, as well as other types of networks. Additionally, the network may support wired transmissions, wireless transmissions, or both wired and wireless transmissions. In some embodiments, network 104 may be a packet-switched communications system. In a preferred embodiment, network 104 may be the Internet.

Figure 2:
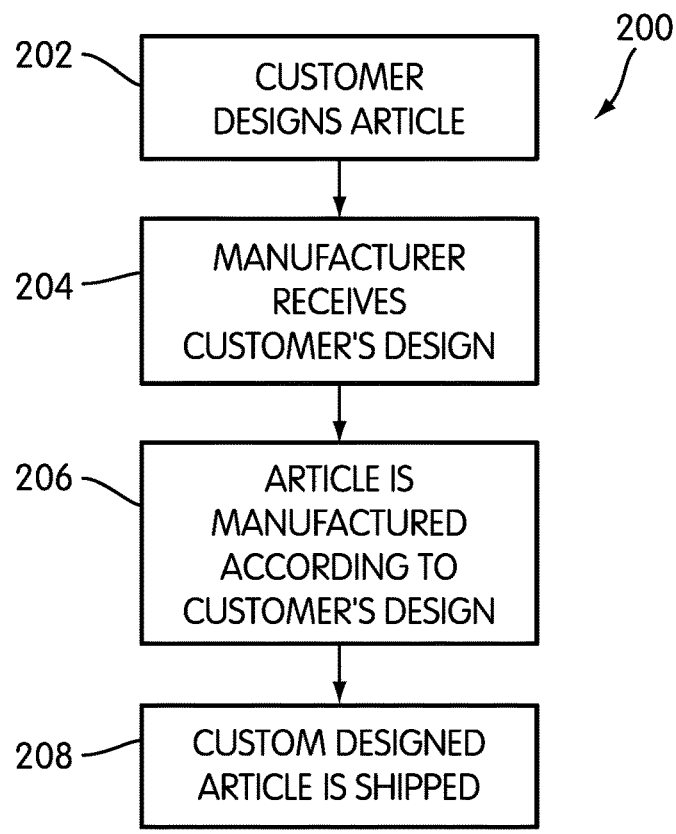
FIG. 2 is a preferred embodiment of a process for a customization system.

Referring to FIG. 2, customization system 101 preferably includes provisions that allow a customer to design an article of footwear that will be produced by a manufacturer. Process 200 is a flow diagram of how customization system 101 may proceed. During first step 202, a customer may interact with a website in order to design the article of footwear. Once the customer has finalized the design, the manufacturer may receive the customer's design, as in second step 204. Following this, the article of footwear is preferably manufactured according to the customer's design during third step 206. Finally, during fourth step 208, the custom designed article of footwear may be shipped to the customer.

Figure 3:
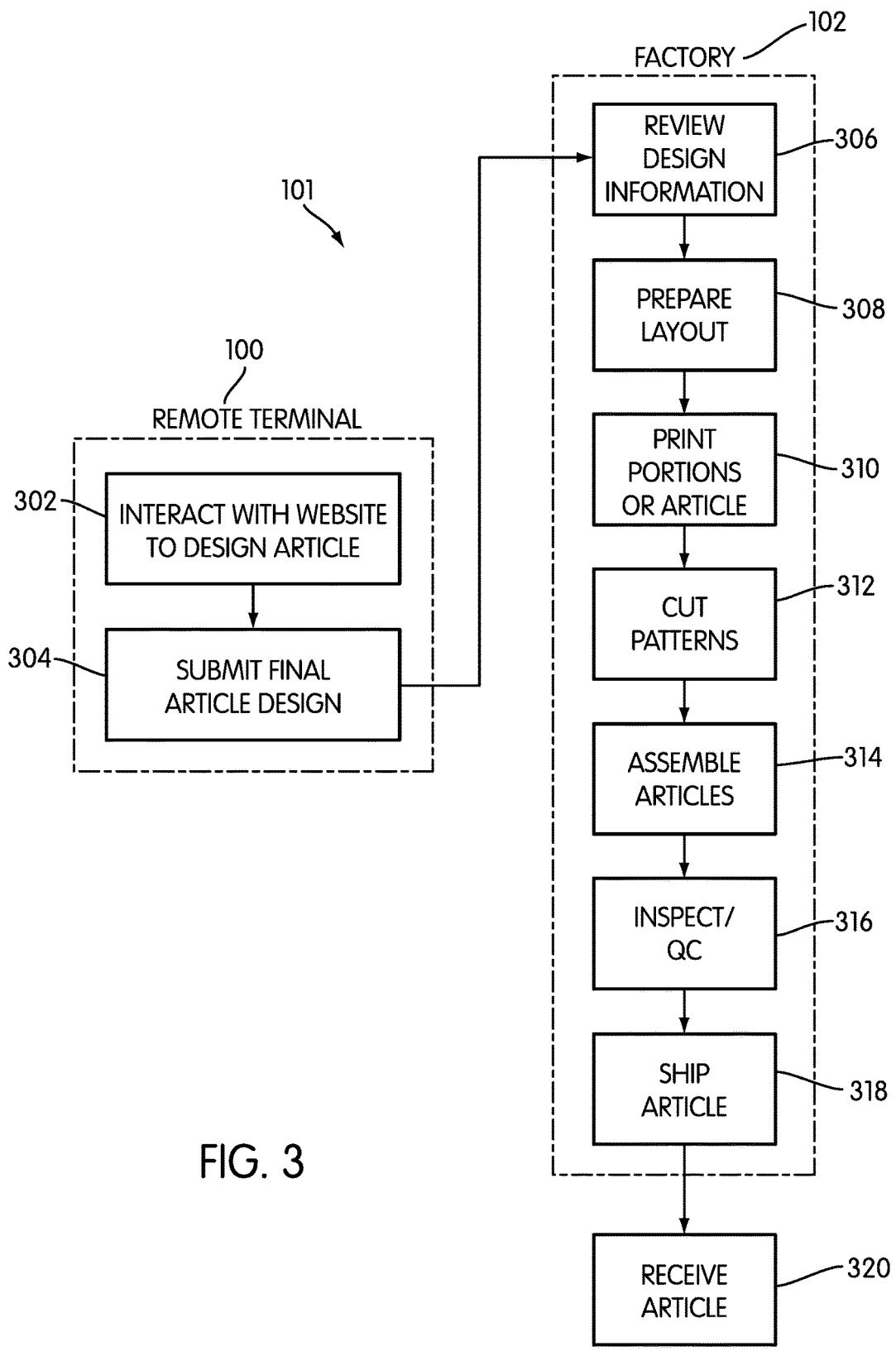
FIG. 3 is a preferred embodiment of a detailed process for a customization system.

Referring to FIG. 3, customization system 101 may be best understood by separating the steps associated with remote terminal 100 and those associated with factory 102. Preferably, those steps associated with remote terminal 100 are performed on or by remote terminal 100 and those steps associated with factory 102 are performed on or by factory 102. However, this is not necessarily the case, and some of the steps associated with remote terminal 100 may be performed on or by factory 102 or some other resource, and some of the steps associated with factory 102 may be performed on or by remote terminal 100 or some other resource.

In step first step 302, a customer may access a remote website with remote terminal 100. Preferably, the customer may use the website to design a customized article of footwear during this step. Here, the term website is used in the most general sense as meaning any collection of data located on a remote server accessible with a web browser of some kind. In many cases, a website may be a collection of web pages found on the World Wide Web. In a preferred embodiment, the term web page may refer to any HTML/XHTML document.

Preferably, factory 102 includes a server of some type that supports a website with a graphical interface system. This graphical interface system may be preferably used to design an article of footwear. In some embodiments, the graphical interface system may be a graphical editor of some kind. In a preferred embodiment, the graphical interface system may provide a set of tools that allow the customer to easily apply a custom design to an article of footwear.

In an alternative embodiment, a website supporting a graphical interface system may be hosted outside of factory 102. In other words, the website may be owned and run by a third party separate from the manufacturer of the customizable articles of footwear. Generally, the process of customizing an article of footwear may proceed as before. In this case, the finalized design information will be processed and sent to the manufacturer by the third party.

Once the customer has finished designing the article of footwear, the finalized design may be submitted to factory 102 during second step 304. In some embodiments, the submission may be transferred through the Internet. Following this submission, factory 102 preferably receives and reviews the customized design during third step 306.

In fourth step 308, a layout may be prepared based on the customized design information received from the customer. During fifth step 310, the various portions of the article of footwear may be printed to a sheet material. During sixth step 312, the printed portions may be cut from the sheet material.

Once the portions of the article of footwear have been prepared, printed, and cut out of the sheet material, they may be assembled during seventh step 314. Following this, the finished article of footwear is preferably inspected during eighth step 316. During the last two steps, ninth step 318 and tenth step 320, the article of footwear is preferably shipped from factory 102 to a pre-designated shipping address.

The following description discusses the details of the steps outlined and briefly described with reference to FIG. 3. Preferably, a customer has access to a remote terminal. Using the remote terminal, the customer may gain access to a website supplied by the manufacturer or a third party. In some embodiments, the website may include a graphical interface system, as discussed briefly in first step 302.

Figure 4:
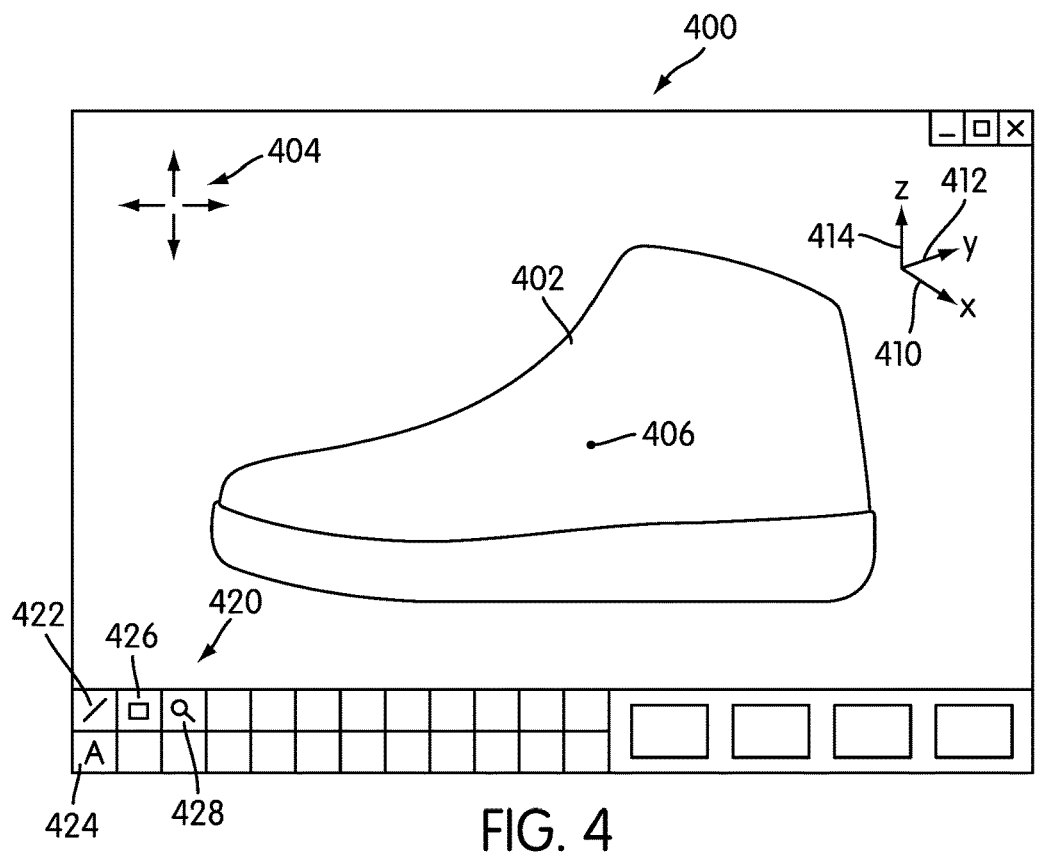
FIG. 4 is a preferred embodiment of a graphical interface system.

Referring to FIG. 4, graphical interface system 400 preferably includes footwear representation 402. The term footwear representation 402, as used throughout this specification and in the claims, refers to a three-dimensional embodiment of an article of footwear within graphical interface system 400. Specifically, the term footwear representation preferably includes the structural design of the represented article of footwear. Additionally, the term footwear representation preferably includes any other design attributes including, but not limited to, patterns, shapes, designs, colors, images, and any other graphical feature of the outer surface of the represented article of footwear.

For the purposes of illustration, footwear representation 402 is depicted here in the form of an athletic shoe. However, in other embodiments, footwear representation 402 may be any other type of footwear including but not limited to, a boot, a basketball shoe, a running shoe, a dance shoe, as well as other kinds of footwear.

Additionally, throughout this specification, it should be understood that not only a single article of footwear, but a pair of footwear may be designed with a customization system. Any designs, tools, or other mechanisms applied to the design of one article of footwear may likewise be applied to a second, complementary, article of footwear. The term complimentary, as used throughout this specification and in the claims, refers to the association of a left article of footwear with a right article of footwear and vice-versa. Also, it should be understood that each article of footwear of a pair may be designed independently. In other words, the complementary articles of footwear need not include identical designs.

Preferably, graphical interface system 400 may include provisions for modifying the view of footwear representation 402. In some embodiments, this may include a provision for moving footwear representation 402 to various regions of graphical interface system 400. In a preferred embodiment, this may include a provision for rotating footwear representation 402 about a set of axes.

In a preferred embodiment, graphical interface system 400 includes directional tool 404. In this embodiment, directional tool 404 is represented by a collection of four arrows. In some embodiments, the graphical representation of directional tool 404 may be different. In some embodiments, directional tool 404 may include additional arrows.

Preferably, directional tool 404 may be configured to change the view of footwear representation 402. Some examples of the types of changes in view include vertical and horizontal translation of footwear representation 402 with respect to center 406 of graphical interface system 400.

In addition, directional tool 404 may be used to rotate footwear representation 402 about x-axis 410, y-axis 412, and z-axis 414. Using directional tool 404, a customer may change the view of footwear representation 402 in order to view different regions of footwear representation 402.

Generally, graphical interface system 400 may include provisions for modifying footwear representation 402. In some embodiments, graphical interface system 400 may include editing tools configured to modify the design of footwear representation 402. In a preferred embodiment, graphical interface system 400 may include tools similar to those found in many graphical editing programs, such as those that draw lines, add text, as well as other features.

Preferably, graphical interface system 400 may include toolbar 420. Toolbar 420 is preferably a collection of various graphics tools. In some embodiments, toolbar 420 may include line tool 422. Additionally, toolbar 420 may include text tool 424. In some embodiments, toolbar 420 may also include shape tool 426 and magnification tool 428. Generally, toolbar 420 may include many additional graphics tools. For illustrative purposes, only a few of the many possible graphics tools are shown here.

Preferably, graphical interface system 400 includes provisions for allowing a customer to import various designs or graphics from outside sources. In some embodiments, a customer may attach various media devices to a remote terminal in order to import various graphics or designs to graphical interface system 400. In a preferred embodiment, a customer may upload pictures or photos from a digital camera or from another source. Generally, images acquired independently of graphical interface system 400 may be referred to as custom designated images.

Figure 5:
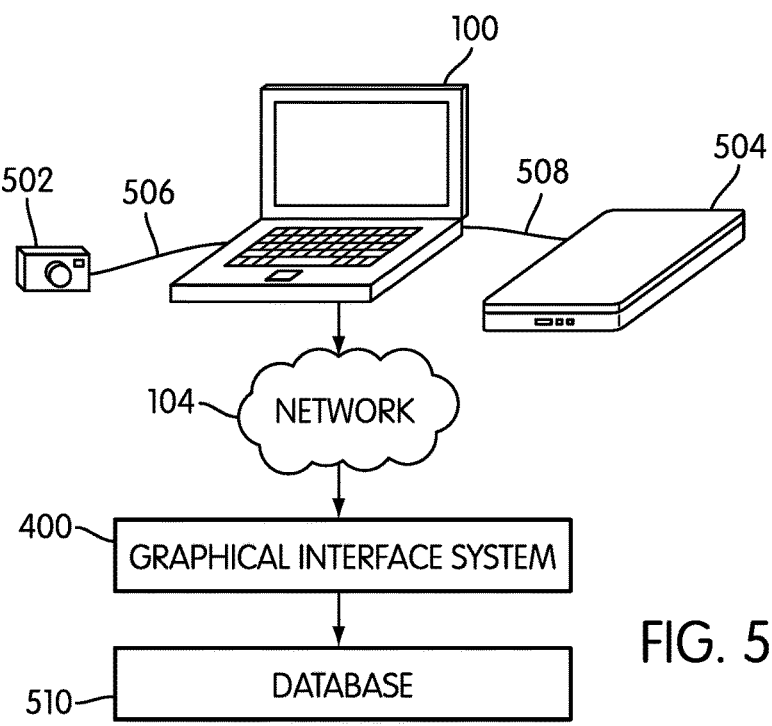
FIG. 5 is a preferred embodiment of a system for gathering custom designated images.
Figure 6:
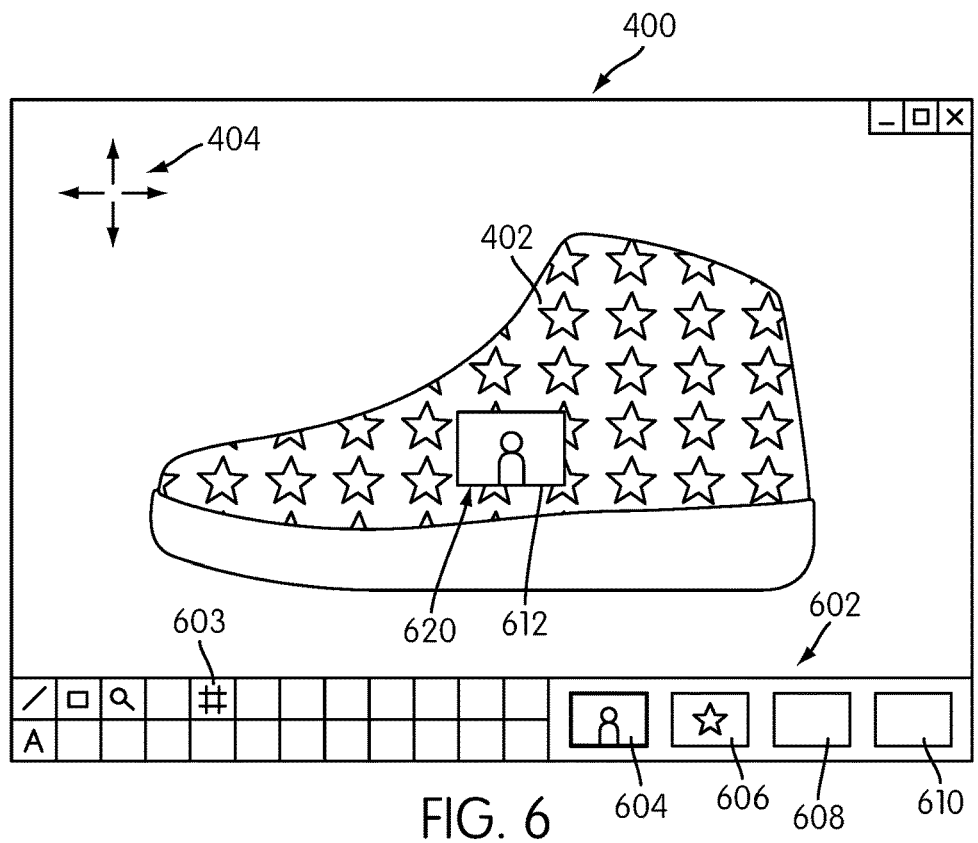
FIG. 6 is a preferred embodiment of a footwear representation with an image.

Referring to FIG. 5-6, remote terminal 100 may be connected to digital camera 502 and scanner 504 through first cable 506 and second cable 508, respectively. Digital camera 502 and scanner 504 are only meant to be representative of the various types of digital media from which a customer may import photos or other types of graphics. Generally, a photograph taken with digital camera 502 may be imported directly to remote terminal 100. Likewise, a photograph may be scanned using scanner 504 and transferred to remote terminal 100. From remote terminal 100, these graphics may be preferably uploaded to graphical interface system 400 through network 104.

In some cases, graphical interface system 400 may be associated with database 510 of pre-designed graphics and images. In a preferred embodiment, database 510 may be connected directly to graphical interface system 400. Database 510 may include any kind of storage device, including but not limited to magnetic, optical, magneto-optical, and/or other memory devices, including volatile memory and non-volatile memory devices.

Generally, images and graphics may be gathered from any source, including the Internet. In this case, images and graphics may be downloaded from network 104 to remote terminal 100 and subsequently transmitted to graphical interface system 400.

In some embodiments, a predefined set of custom designated images may be loaded into image palette 602. In this embodiment, first image 604 represents a photo that has been imported into graphical interface system 400 by a customer through remote terminal 100. In some embodiments, image palette 602 may also include second image 606, third image 608, and fourth image 610. Each of these images may have been loaded into graphical interface system 400 from remote terminal 100, from database 510, or from another separate source.

Once the customer has selected first image 604, first copied image 612 of first image 604 may be placed along a customer selected portion 620 of footwear representation 402. Generally, a customer selected portion may be any portion of footwear representation 402. In particular, the customer selected portion need not be a predefined location along footwear representation 402 determined by someone other than the customer.

In this embodiment, first copied image 612 may be identical to first image 604. Additional copies of first image 604 may also be placed along footwear representation 402. Using directional tool 404, the customer may move first copied image 612 so that it is disposed along any portion of footwear representation 402.

In some embodiments, a user may wish to design an article of footwear that will include a tiled image. The term "tiling," as used herein, refers to the repeated use of the same image along the article of footwear, preferably in a precise geometric pattern, such as rows and columns. In this embodiment, second image 606 may be selected and tiled along footwear representation 402, using tiling tool 603. Although, in this embodiment, second image 606 is a simple shape, in other embodiments any image, photo, or word may be tiled using tiling tool 603. In still other embodiments, numbers and/or various logos may be added to footwear representation 402 along any portion. These numbers and/or logos may also be tiled.

Generally, a customization system for an article of footwear may include provisions for applying words or letters to an article of footwear. In some embodiments, a graphical interface system may include a provision for applying letters to a footwear representation. In a preferred embodiment, the graphical interface system may include a text tool.

Figure 7:
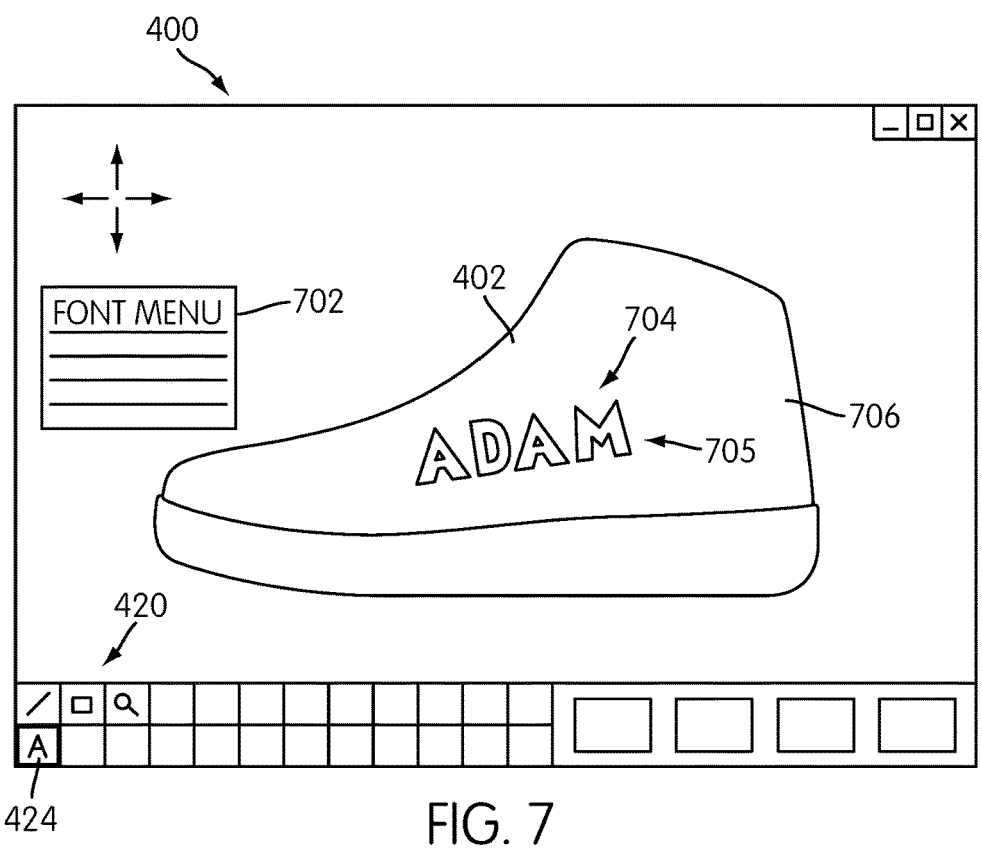
FIG. 7 is a preferred embodiment of a footwear representation with text.

Referring to FIG. 7, toolbox 420 preferably includes text tool 424, as previously discussed. In some embodiments, text tool 424 may be applied to any portion of footwear representation 402. In a preferred embodiment, text tool 424 includes a variety of fonts as well as font sizes and colors. In other words, a customer may add letters or words to footwear representation using the default font and default font size. Following this, the customer may modify the font type, font size and/or font color using font menu 702.

In this embodiment, footwear representation 402 includes first text 704. In some embodiments, first text 704 may be disposed along customer selected portion 705 of medial side 706. In a preferred embodiment, first text 704 may be a name. Generally, first text 704 may be any group of letters that may be fit along medial side 706 of footwear representation 402.

In many cases, the customer may prefer a particular background color or a set of colors for footwear representation 402. As the design will eventually be printed onto a sheet material that may not have the desired background color, graphical interface system 400 preferably includes provisions for allowing the customer (or the manufacturer) to implement a specific background color, or set of background colors (including a background image) to footwear representation 402. By printing a background color, substantially all of an article of footwear can be colored using a digital printing process.

Preferably, a graphical interface system may include provisions for easily applying simple patterns to a footwear representation. Since the footwear representation is a two-dimensional representation of a three-dimensional object, the application of stripes and other design patterns to the footwear representation should reflect the curved nature of the article of footwear. In this case it may be preferable that the graphical interface system include tools for easily applying various patterns to the curved surfaces of the footwear representation.

Figure 8:
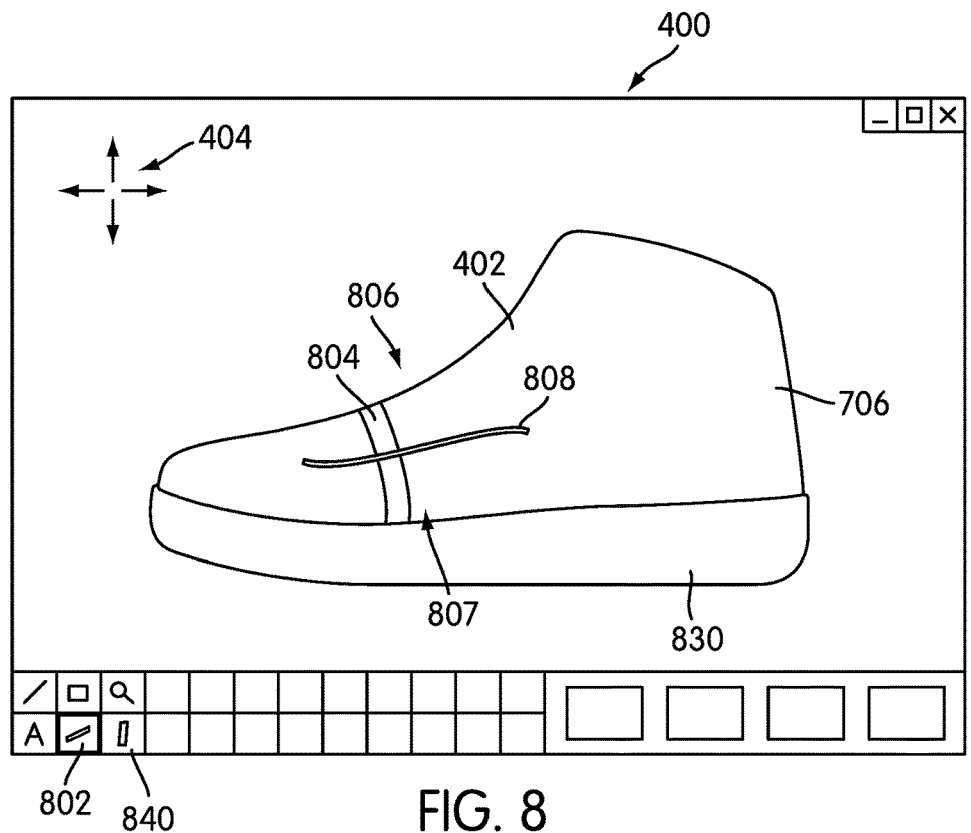
FIG. 8 is a preferred embodiment of a footwear representation with stripes.
Figure 9:
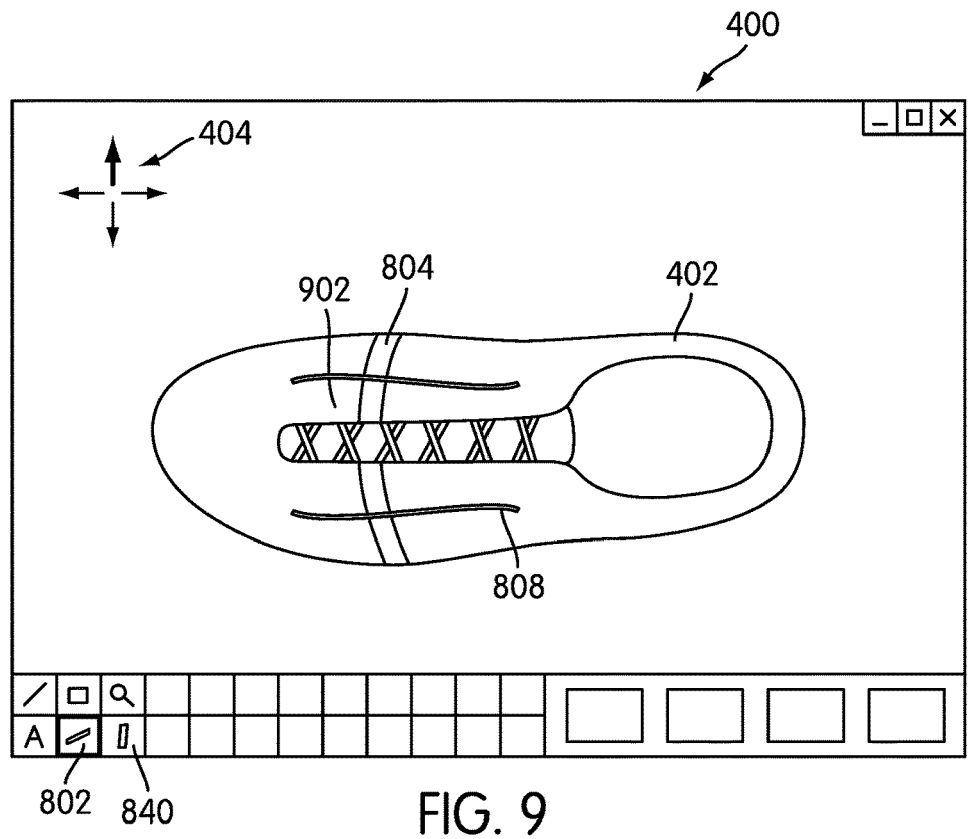
FIG. 9 is a preferred embodiment of a footwear representation with stripes.
Figure 10:
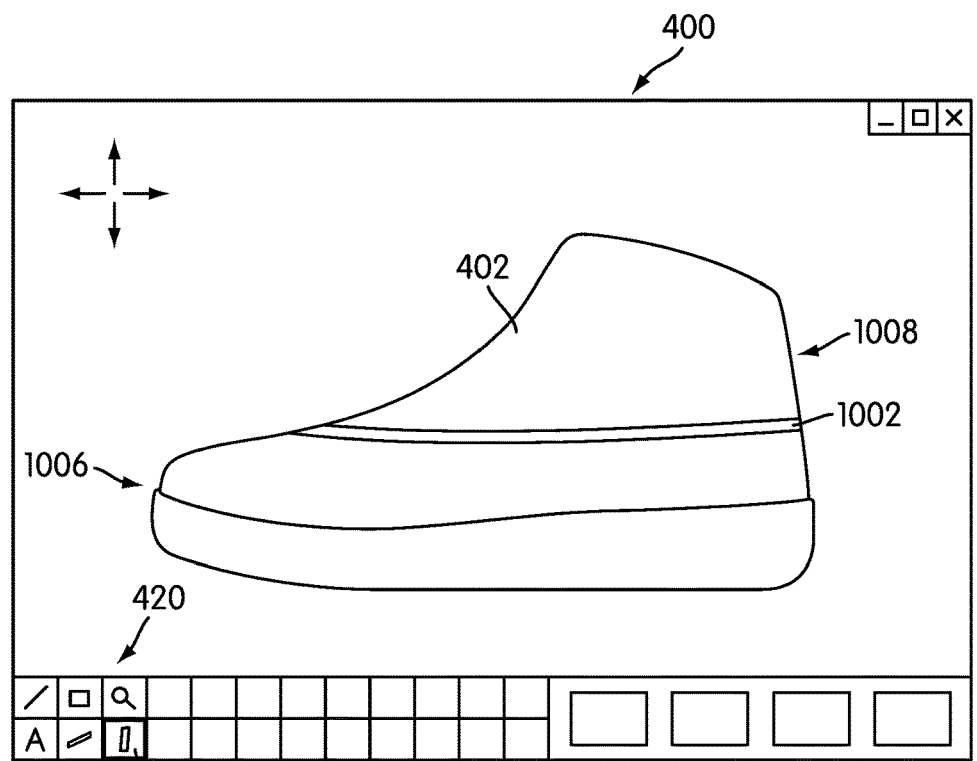
FIG. 10 is a preferred embodiment of a graphical interface system.

Referring to FIGS. 8-10, graphical interface system 400 may include freehand line tool 802 and single stripe tool 840. In some embodiments, selecting free hand line tool 802 may allow the user to draw free hand line 808 along footwear representation 402. In particular, free hand line tool 802 is preferably configured to apply a user drawn wavy line along customer designated portion 807 of footwear representation 402. Generally, custom selected portion 807 may be associated with any portion of footwear representation 402.

In some cases, single stripe tool 840 may be selected, resulting in the application of stripe 804 to footwear representation 402. Preferably, stripe 804 is disposed over throat region 806 of footwear representation 402. Using directional tool 404 to rotate footwear representation 402, vamp region 902 of footwear representation 402 may be seen to include stripe 804. In other words, stripe 804 continues from outsole 830 of medial side 706 to vamp region 902. In a similar manner, stripe 804 also preferably extends to a lateral side of footwear representation 402.

In some embodiments, stripes may be applied in a direction perpendicular to stripe 804. In other words, stripes that are oriented along the length of footwear representation 402 may be applied. In a preferred embodiment, third stripe 1002 may be applied to footwear representation 402 using single stripe tool 840. In this embodiment, third stripe 1002 preferably runs from front region 1006 to rear region 1008 of footwear representation 402.

With free hand line tool 802 and single stripe tool 840 the customer need not account for the three dimensionality of the surface of the final article of footwear in applying stripes, lines or images to footwear representation 402. Instead, graphical interface system 400 applies the stripes, lines, or images in a manner that matches the structural design of the final article of footwear. Additionally, the thicknesses of shapes created using free hand line tool 802 and single stripe tool 840 may be varied. In some embodiments, the colors of stripes created using free hand line tool 802 and single stripe tool 840 may also be varied. In a preferred embodiment, each of the tools 802 and 840 may include customizable options including a thickness level and a color selector.

The tools intended for graphic design and editing mentioned here are not meant to be exhaustive, but only illustrative of the various types of graphical and editing tools that may be applied to footwear representation 402 in order to allow a customer to personally customize an article of footwear to their exact specifications. Examples of other graphical and/or editing tools that may be included in toolbox 420 or within graphical interface system 400 in general, include but are not limited to, selection tools, direct selection tools, magic wand tools, pen tools, line segment tools, paintbrush tools, pencil tools, gradient tools, paint bucket tools, cropping tools, as well as other kinds of tools.

Generally, each of the tools mentioned previously may be applied simultaneously in order to customize an article of footwear. In some embodiments, text may be combined with stripes and/or lines. In other embodiments, lines may be combined with custom designated images. In some embodiments, stripes, text, and custom designated images may be applied to the same footwear representation.

Figure 11:
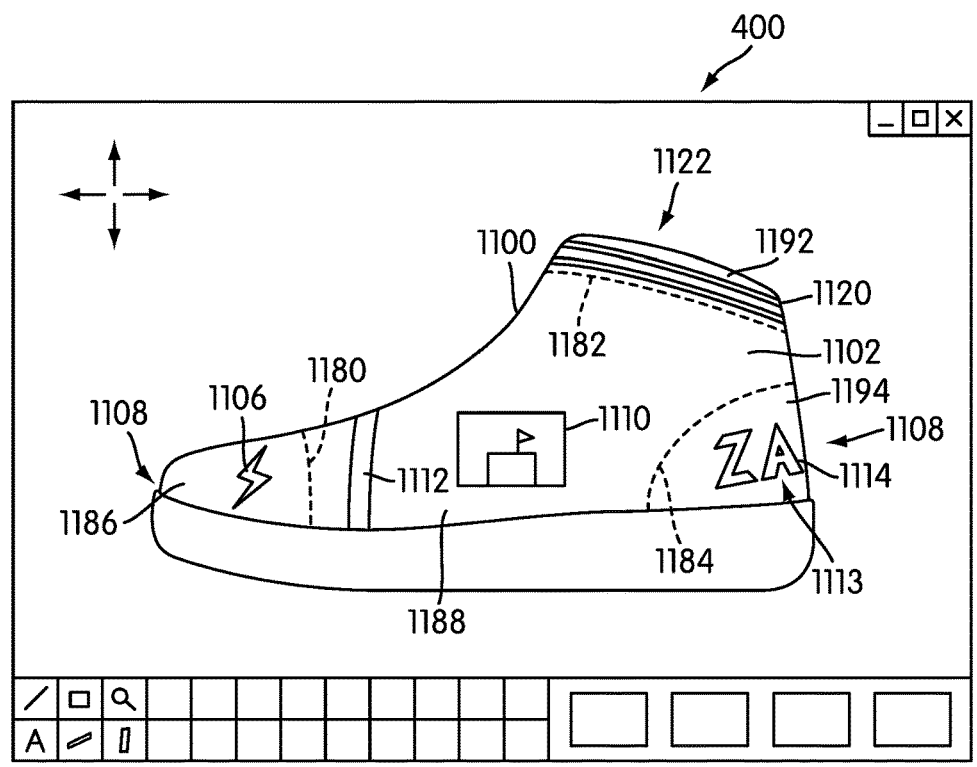
FIG. 11 is a preferred embodiment of a graphical interface system.

FIG. 11 is a preferred embodiment of graphical interface system 400 including customized footwear representation 1100. In this embodiment, customized footwear representation 1100 is oriented so that medial side 1102 is visible. In some embodiments, customized footwear representation 1100 may include first lightning bolt 1106 disposed along front region 1108. Additionally, customized footwear representation 1100 may include first photo 1110 and large stripe 1112, disposed along medial side 1102. Additionally, first portion 1113 of text 1114 may be disposed along rear region 1116. Finally, small stripes 1120 are preferably disposed along cuff region 1122.

Figure 12:
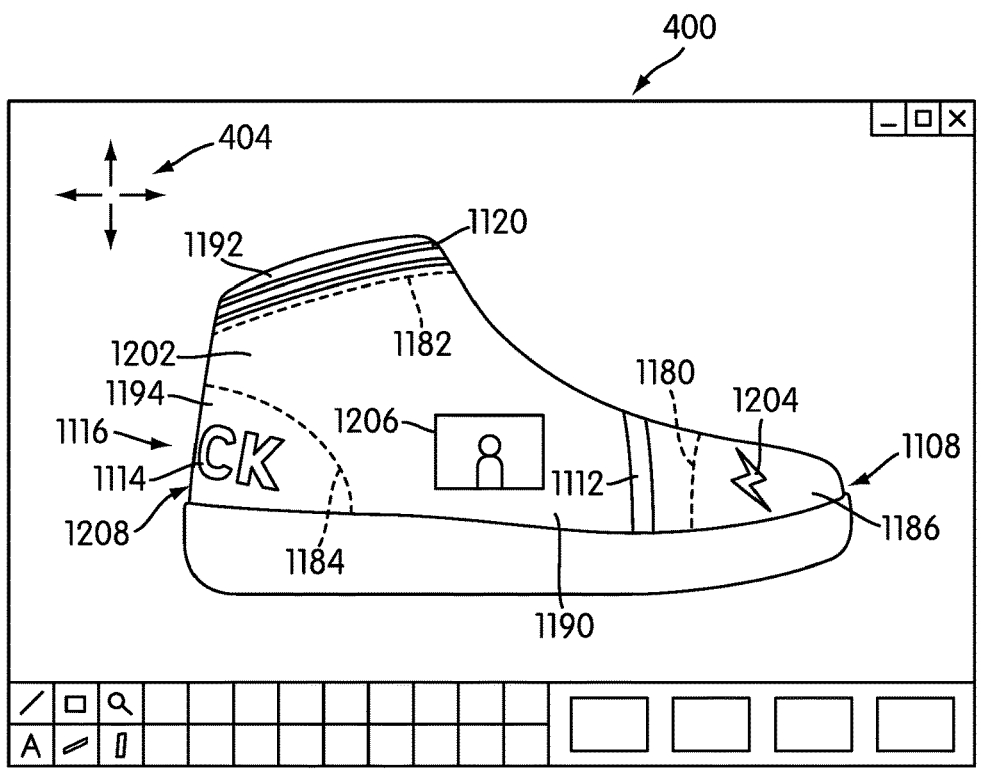
FIG. 12 is a preferred embodiment of a graphical interface system.

Using directional tool 420, lateral side 1202 of customized footwear representation 1100 may be displayed within graphical interface system 400, as seen in FIG. 12. In a similar manner to medial side 1102, lateral side 1202 preferably includes second lightning bolt 1204 disposed along front region 1108. Lateral side 1202 also preferably includes second photo 1206. Preferably, rear region 1116 may include second portion 1208 of text 1114. Finally, lateral side 1202 also preferably includes large stripe 1112 and small stripes 1120.

Once a customer has finished customizing a design for an article of footwear, they may be provided with an option of duplicating the design for a second, complementary, article of footwear. In some embodiments, this option may be provided through the graphical interface system. In a preferred embodiment, the graphical interface system may include a button configured to duplicate a design and apply it to a second, complementary, article of footwear. In some embodiments, the customer may decline this duplication option and proceed to independently design a second, complementary, article of footwear.

Preferably, once the customer has completed the designs for a pair of articles of footwear, these designs may be finalized and submitted to the factory, as previously discussed. Once the designs have been received by the factory, the article of footwear may be produced by a series of steps as discussed with respect to FIG. 3. For clarity, the following detailed discussion includes the steps of producing the first article of footwear based on a customized design. However, it should be understood that these same steps apply to the production of the second, complementary article of footwear as well.

The following detailed discussion discusses the steps of applying a customized footwear representation to an article of footwear. In some embodiments, a footwear representation to be applied to an article of footwear may be pre-designated by the manufacturer or by a third party designer. In other words, the design to be applied to an article of footwear need not be created using the customization system previously discussed. For clarity, the following detailed description discusses steps for applying a customer created customized design to an article of footwear, however it should be kept in mind that the customized design may include designs created by the manufacturer, a third party designer, or anyone else. Additionally, in some embodiments, a design for an article of footwear may be originally designed as a two dimensional surface. In such an embodiment, the following steps of converting a three dimensional design into two-dimensional portions may be skipped.

Preferably, a customization system may include provisions for converting a three-dimensional customized footwear representation into two-dimensional portions that may be printed onto a two dimensional surface. In some embodiments, these provisions may include a step for associating the two-dimensional portions with a two-dimensional surface. In a preferred embodiment, the two-dimensional portions may be oriented in a manner that reduces the space between them. This optimization step may be included in order to reduce the amount of excess sheet material that is used once the two-dimensional portions are printed onto the sheet material.

Referring to FIGS. 11-15, converting the customized design of a footwear representation into flat portions that may be printed preferably includes several steps. During a first step, customized footwear representation 1100 may be divided into several portions. A preferred embodiment of the division of customized footwear representation 1100 may be visualized with first boundary 1180, second boundary 1182, and third boundary 1184. In this embodiment, first boundary 1180 separates forefoot portion 1186 from medial portion 1188 and lateral portion 1190. Second boundary 1182 also separates cuff portion 1192 from medial portion 1188 and lateral portion 1190. Similarly, third boundary 1184 preferably separates heel portion 1194 from medial portion 1188 and lateral portion 1190. A fourth boundary, not shown here, separates medial portion 1188 and lateral portion 1190 along the top of customized footwear representation 1100.

Figure 13:
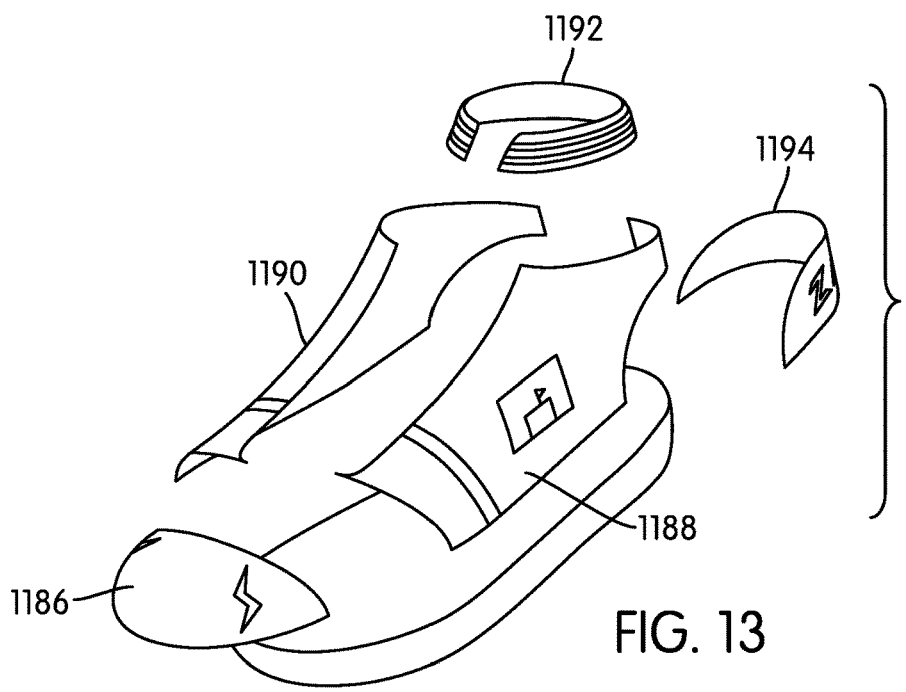
FIG. 13 is an isometric exploded view of a preferred embodiment of a footwear representation.

FIG. 13 is an isometric exploded view of portions 1186, 1188, 1190, 1192 and 1194 into which customized footwear representation 1100 may be divided. Preferably, each of the portions 1186, 1188, 1190, 1192, and 1194 is configured so that they may be flattened along a two dimensional surface.

During a third and final step, following the division of customized footwear representation 1100 into various portions, an optimization procedure is performed in order to minimize the amount of excess material between each portion along a two dimensional layout. In a preferred embodiment, each of the portions 1186, 1188, 1190, 1192, and 1194 may be rearranged along a two-dimensional surface in order to minimize the space between them.

Figure 14:
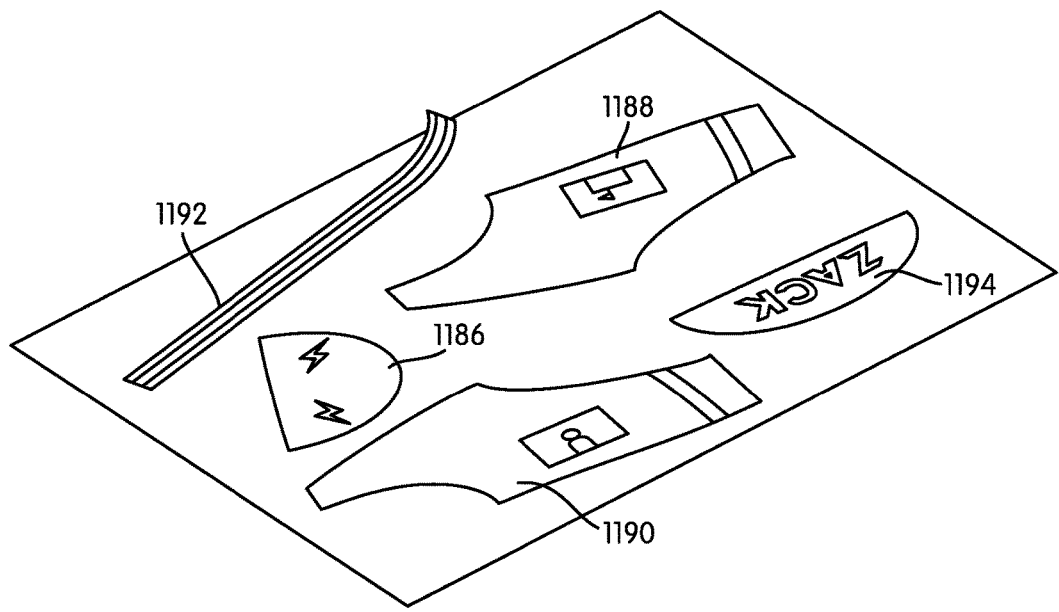
FIG. 14 is an isometric view of a preferred embodiment of several two-dimensional portions.
Figure 15:
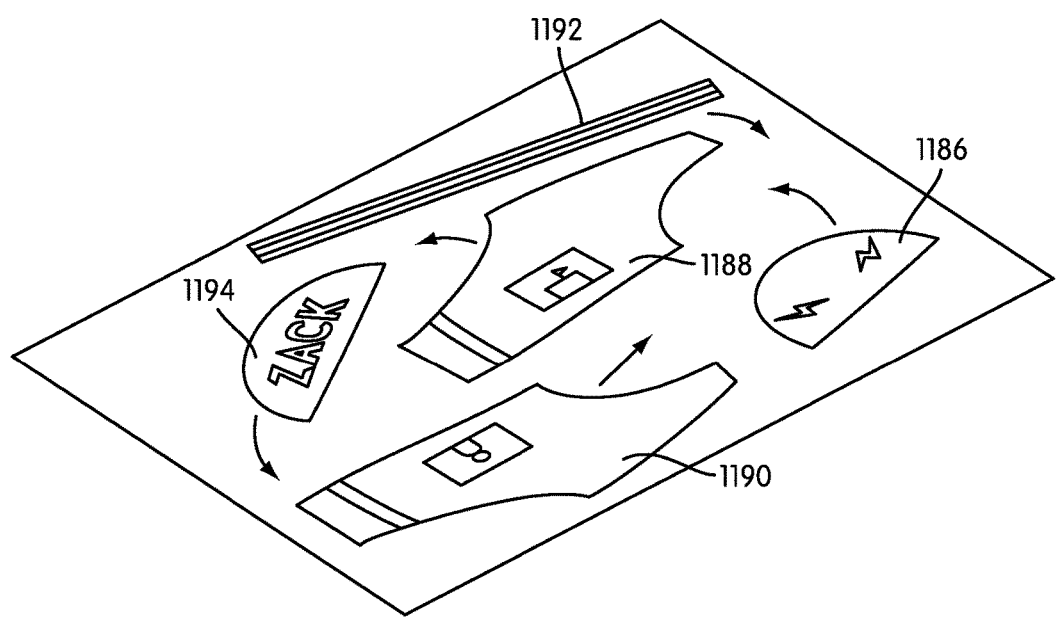
FIG. 15 is an isometric view of a preferred embodiment of several two-dimensional portions.

The preceding discussion of a layout procedure uses FIGS. 13-15 for illustrative purposes only. Generally, the layout may be managed by a computer algorithm that uses calculations to determine an optimized layout. The steps discussed here are only intended to figuratively represent the general procedure by which an algorithm may optimize the layout of two dimensional portions.

Figure 16:
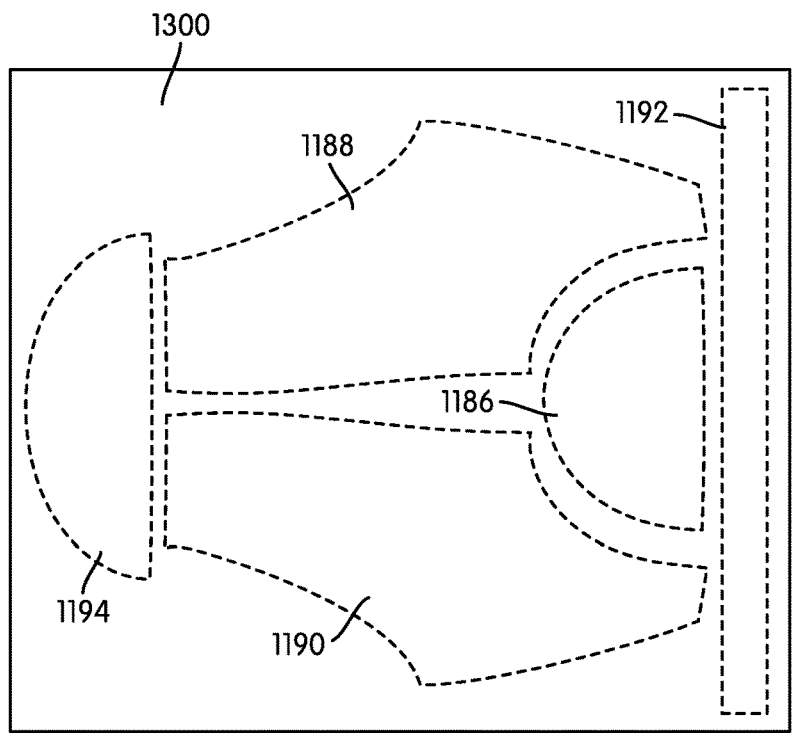
FIG. 16 is a plan view of a preferred embodiment of a sheet material.

Finally, a pre-configured size of sheet material 1300 may be selected based on the final arrangement of portions 1186, 1188, 1190, 1192, and 1194, as seen in FIG. 16. In this embodiment, the outlines of portions 1186, 1188, 1190, 1192, and 1194 may be visualized for illustrative purposes only. Generally, the outlines of these portions 1186, 1188, 1190, 1192, and 1194 may not be apparent until sheet material 1300 has been placed through a printer.

Sheet material 1300 may be any material associated with manufacturing articles of footwear. Example sheet materials include, but are not limited to, felt, leather, synthetic leather, and/or micro-fiber. Generally, any suitable knitted, woven, and/or non-woven textile material may be used as sheet material 1300. Additionally combinations of these materials may also be used to form a composite material. In a preferred embodiment, sheet material 1300 may be synthetic leather.

Generally, the size of sheet material 1300 may vary. Some articles of footwear may be configured to different shoe sizes as well as different shoe styles. These variations may require various different sheet material sizes. In a preferred embodiment, sheet material 1300 may be a stock material that is provided as a continuous roll. In other embodiments, sheet material 1300 may be a cut sheet. Using a stock material, only the necessary amount of material can be processed or printed. This can help to reduce waste.

In some embodiments, sheet material 1300 may be configured for printing two complementary articles of footwear. Generally, as was done for first customized footwear representation, a second customized footwear representation would be divided into two-dimensional portions. An optimized layout for both articles of footwear would include these additional two-dimensional portions as well.

Figure 17:
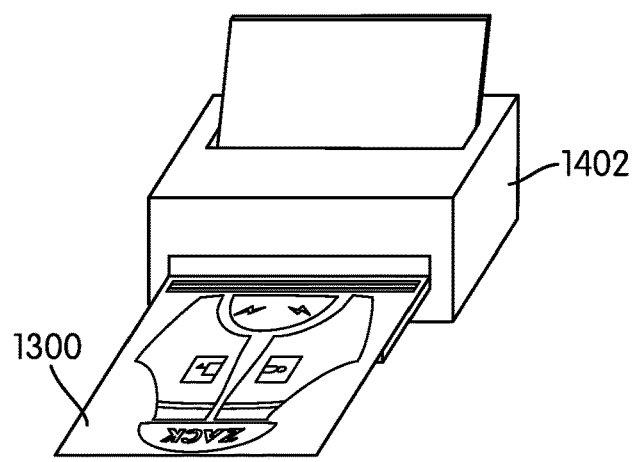
FIG. 17 is an isometric view of a preferred embodiment of a printer.

Referring to FIG. 17, a customization system preferably includes provisions for applying any designs including customized designs to sheet material 1300. In some embodiments, printer 1402 may be used to apply customized designs to sheet material 1300. Generally, printer 1402 may be any type of printer, including, but not limited to a dot matrix printer, an ink jet printer, a laser printer, as well as other kind of printer. In a preferred embodiment, printer 1402 may be any digital printer.

Figure 18:
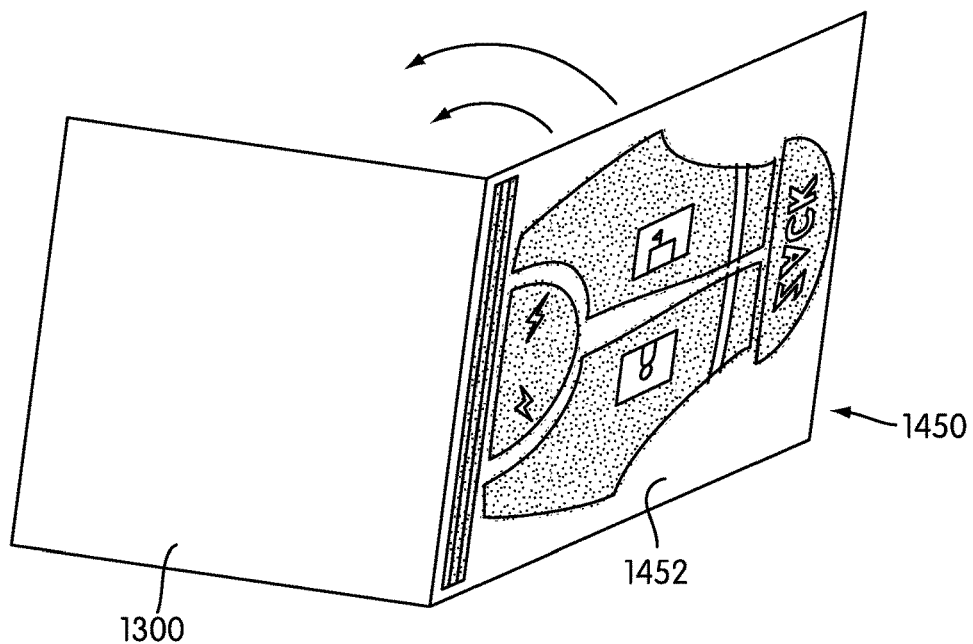
FIG. 18 is a view of a preferred embodiment of a printed film in reverse.

In some embodiments, a custom design may be applied to sheet material 1300 using a film transfer, or film lamination method. In the embodiment shown in FIG. 18, the custom design may be printed onto film 1450. Any technique may be used to print onto film 1450, including the techniques mentioned above. In some embodiments, film 1450 may be a thin layer of polyurethane. In other embodiments, film 1450 may be a material containing polyester. Preferably, the design may be printed in reverse, on a printed side 1452 of film 1450. The printed side 1452 can then be placed against sheet material 1300, as shown in FIG. 18. Printing in reverse on printed side 1452 allows the correct image of the custom design to appear when film 1450 is flipped so that printed side 1452 confronts sheet material 1300, and the custom design is viewed through upper side 1454 of film 1450. Preferably, film 1450 is substantially transparent, allowing the custom design to be visible from upper side 1454 of film 1450.

Figure 19:
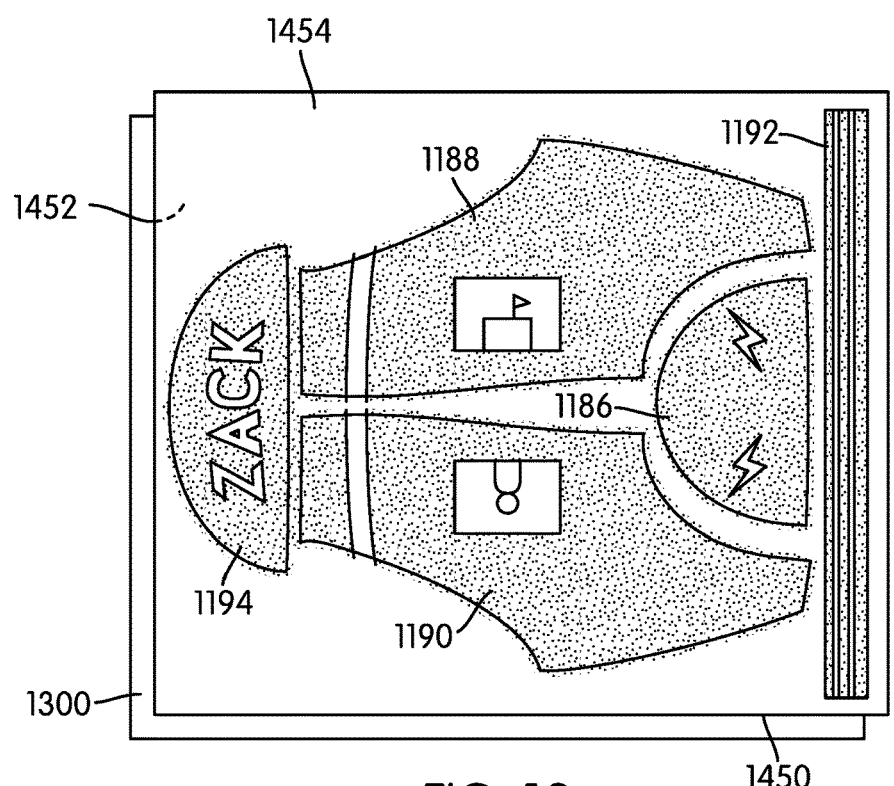
FIG. 19 is a top view of a preferred embodiment of a printed film.

It should be understood that in some cases the application of a printed design to an article of footwear may include printing the entire article of footwear. In the embodiment shown in FIG. 19, the entirety of portions 1186, 1188, 1190, 1192, and/or 1194 may be colored. Referring to FIG. 19, shading applied to entire portions 1186, 1188, 1190, 1192 and 1194 represents an embodiment where substantially the entire upper of an article of footwear has been colored by a digital printing process. In other words, it is not simply images, stripes or other designs that are printed onto film 1450 and associated with sheet material 1300, but also the background portions, which can be thought of as analogous to base colors of the article, have been printed as a specific color.

In some embodiments, the background or base coloring may exceed the expected cut out region of portion 1186, 1188, 1190, 1192, or 1194. This can be referred to as bleeding, and this can be done to insure that the entire portion is completely colored, and that minor printing errors, misalignment, or cutting variations do not reveal blank, uncolored areas.

Even in cases where the sheet material is substantially identical in color to the background color of portions 1186, 1188, 1190, 1192 and 1194, the background may still be printed to film 1450 or directly to sheet material 1300.

This preferred configuration may also be true for other embodiments. Generally, all the material used to manufacture an upper for an article of footwear may be cut from sheet material 1300. Additionally, any portion of sheet material 1300 may be printed to, and therefore any of the material used to manufacture the upper of an article of footwear using this method may be printed. This is useful since, as previously discussed, the sheet material may be made of a material with a color that is different from the desired background color of the footwear representation designed by a customer or other party. With this method, the entirety of the article of footwear may be made to have any background color (or colors) designed by the customer or another party.

This method of printing onto the entirety of the material configured to be used in manufacturing an article of footwear is preferred over traditional methods of printing to articles of footwear or clothing that only provide a method of printing to a portion of the article. These traditional methods lack the means of printing to the entirety of the material configured for use in making the upper of an article of footwear. Instead, they generally rely on printing a single image, design, text, or portion of an article, including articles of footwear.

Figure 20:
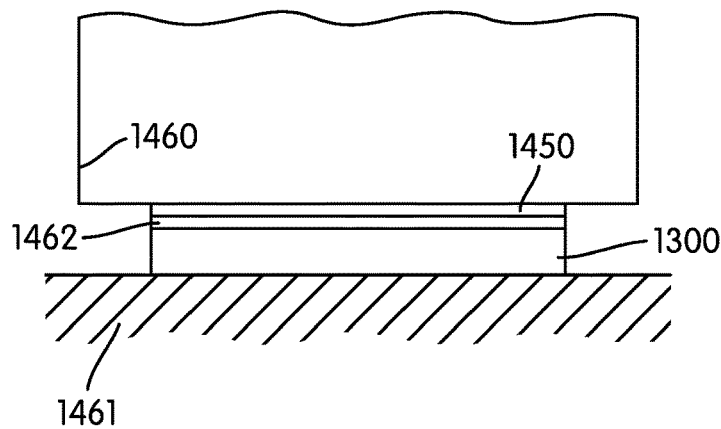
FIG. 20 is a side view of a preferred embodiment of a printed film being transferred to a material using a press.

Once film 1450 has been associated with material 1300, several methods may be used to bond film 1450 to sheet material 1300. Generally, applying heat and/or pressure to film 1450 may cause film 1450 to bond with sheet material 1300. In FIG. 20, press 1460 preferably applies pressure and heat to film 1450, including ink layer 1462. This pressing and heating process preferably attaches film 1450, including ink layer 1462 to sheet material 1300.

In other embodiments, in the process of attaching a film to a sheet material, a texture may be applied to the film. In some embodiments, an embossing plate or a plate with a textured release paper may be used. In other embodiments, an embossing roll may be used.

Figure 21:
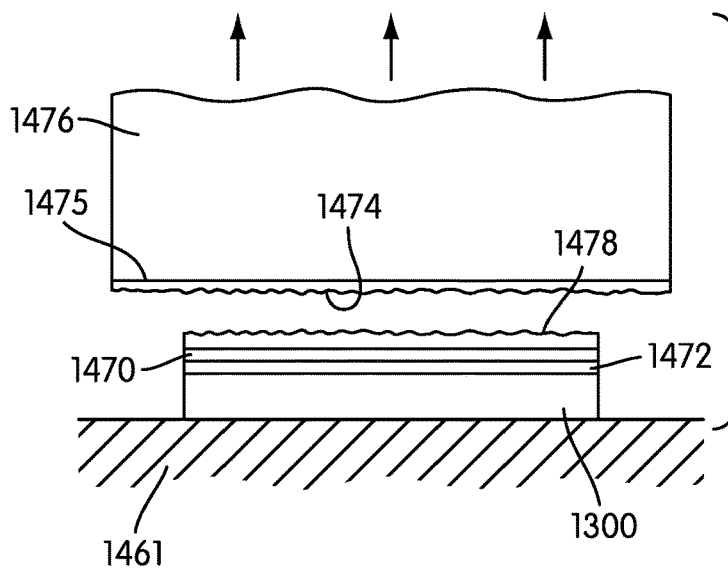
FIG. 21 is a side view of a preferred embodiment of a printed film being transferred to a material using a press.

FIG. 21 is a preferred embodiment of a system for attaching a film to sheet material 1300. In this embodiment, film 1470, including ink layer 1472, has just been bonded to sheet material 1300 by press 1476, using heat and pressure. In this embodiment, press 1476 includes a textured surface 1474. This textured surface 1474 deflects or plastically deforms the upper surface 1478 of film 1470. In some embodiments, press 1476 may be referred to as an embossing plate. However, in other embodiments, a textured paper may be attached to the lower surface 1475—which in this embodiment is smooth—of press 1476, to apply a texture to film 1470.

Figure 22:
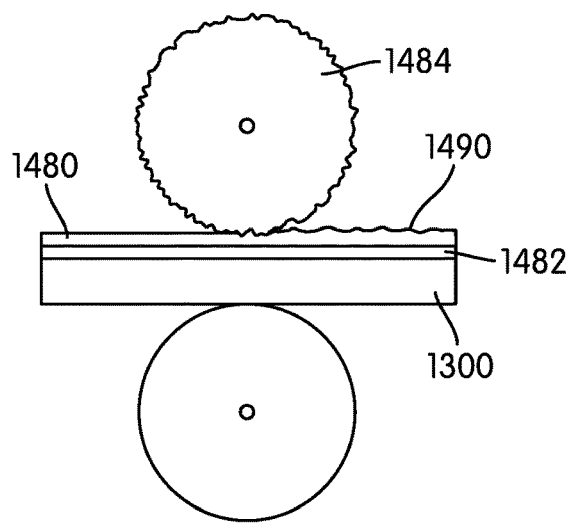
FIG. 22 is a side view of a preferred embodiment of a printed film being transferred to a material using an embossing roll.

In another embodiment, shown in FIG. 22, film 1480, including ink layer 1482, can be bonded to sheet material 1300 using embossing roll 1484. In this embodiment, the upper surface of film 1480 is plastically deformed under the heat and pressure applied by embossing roll 1484 during the bonding process. This results in a composite structure of film 1480, having a textured surface 1490, attached to substrate 1300.

Using one of the preferred film transfer techniques described here, the design of an article of footwear may not be limited by the processes associated with simple printing techniques. Instead, film transfer methods may be used to provide textured surfaces due to deformations of the film itself during an embossing process, or through the use of release paper. Therefore, the finished product may include various textures in addition to colors and other visible design features.

Figure 23:
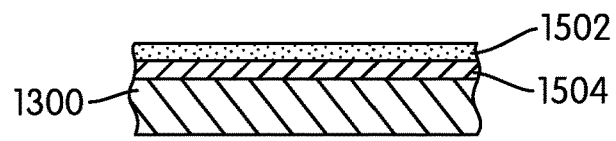
FIG. 23 is a side cross sectional view of a preferred embodiment of a sheet material.
Figure 24:
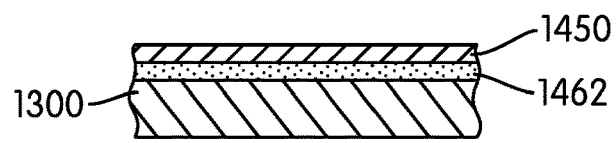
FIG. 24 is a side cross sectional view of a preferred embodiment of a sheet material.

In some embodiments, printer 1402 may be used to apply a protective coating directly to sheet material 1300, without the use of a film transfer technique, once a customized design has been printed onto sheet material 1300. In some embodiments, printer 1402 may apply protective coating 1502, as seen in FIG. 23. Preferably, protective coating 1502 is applied on top of ink layer 1504.

Figure 25:
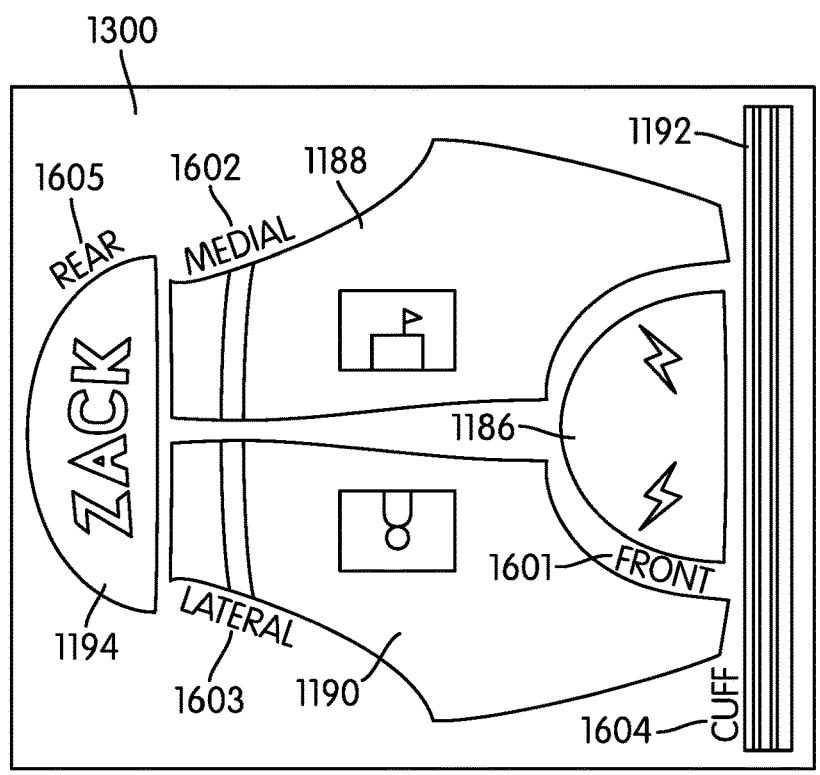
FIG. 25 is a plan view of a preferred embodiment of a printed sheet material.

FIG. 25 is a two dimensional layout of portions 1186, 1188, 1190, 1192, and 1194, disposed along sheet material 1300. In some embodiments, sheet material 1300 may also include first label 1601, second label 1602, third label 1603, fourth label 1604, and fifth label 1605. Generally, labels 1601-1605 may be used to describe the names of portions 1186, 1188, 1190, 1192, and 1194, respectively. For example, in this embodiment, first label 1601 may be FRONT, second label 1602 may be MEDIAL, third label 1603 may be LATERAL, fourth label 1604 may be CUFF, and fifth label 1605 may be REAR. Using this configuration, a worker who may facilitate the assembly of the various pieces into a final article of footwear may know how to assemble the portions together.

Figure 26:
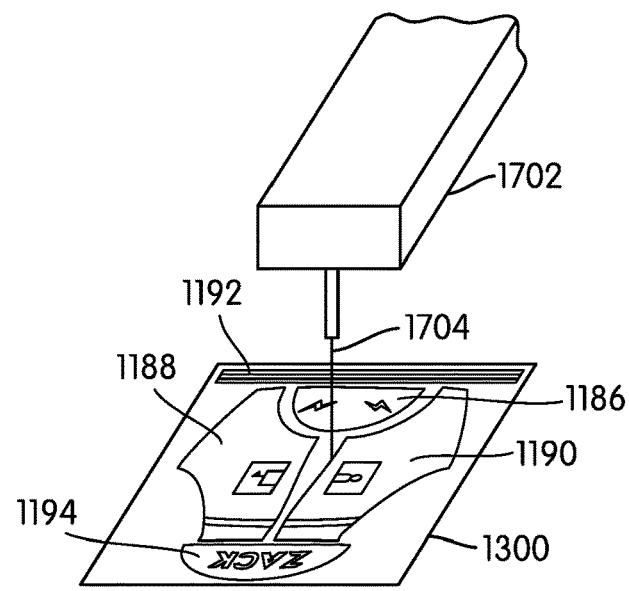
FIG. 26 is an isometric view of a preferred embodiment of a sheet material being cut.

Preferably, a customization system includes provisions for removing portions 1186, 1188, 1190, 1192, and 1194 from sheet material 1300. In some embodiments, the customization system may include cutting machine 1702, seen in FIG. 26. Generally, cutting machine 1702 may be any kind of device that cuts portions 1186, 1188, 1190, 1192, and 1194 from sheet material 1300. In some embodiments, cutting machine 1702 may include blade 1704. In other embodiments, cutting machine 1702 may include other provisions for removing portions 1186, 1188, 1190, 1192, and 1194 from sheet material 1300. In some embodiments, cutting may be done via a laser.

Figure 27:
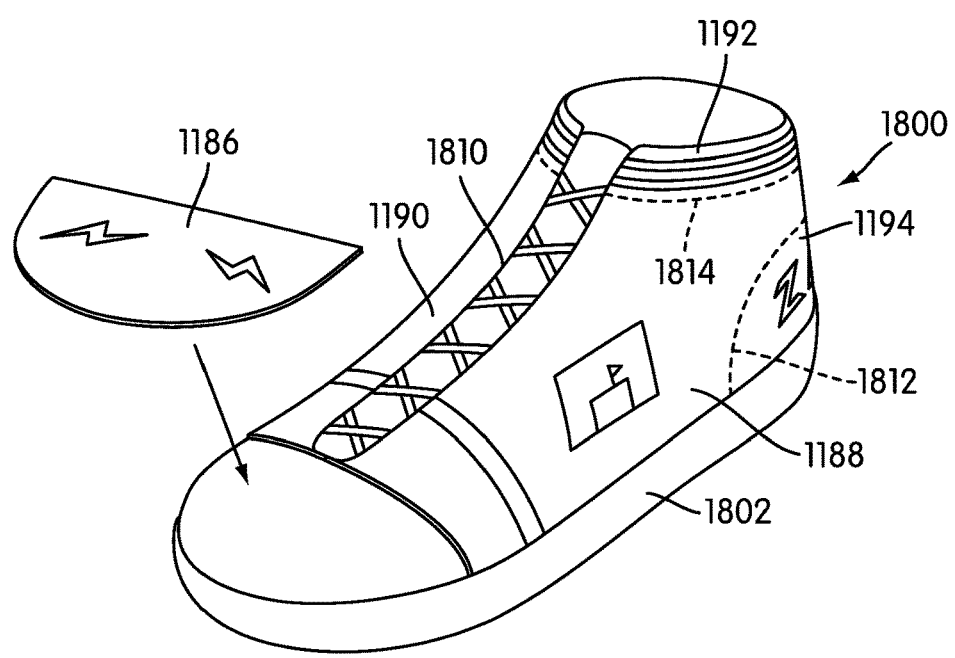
FIG. 27 is an isometric view of a preferred embodiment of an article of footwear being assembled.

Referring to FIG. 27, once portions 1186, 1188, 1190, 1192, and 1194 have been removed from sheet material 1300, they may be assembled. In this embodiment, portions 1186, 1188, 1190, 1192 and 1194 have already been assembled with outsole 1802 to construct article of footwear 1800. Forefoot portion 1186 is preferably configured to attach to medial portion 1188, lateral portion 1190, and outsole 1802.

Generally, the assembly of article of footwear 1800 may be accomplished by stitching together portions 1186, 1188, 1190, 1192 and 1194. In some embodiments, a worker may accomplish the stitching. In other embodiments, an automated machine may accomplish the stitching. In a preferred embodiment, a worker may facilitate stitching that is accomplished by an automated machine.

Once article of footwear 1800 has been fully assembled, it may be inspected for quality by the manufacturer. During this step, the assembled article of footwear 1800 may be compared to the customer designed footwear representation. Therefore, article of footwear 1800 is not only inspected for structural integrity, but also for design accuracy.

Figure 28:
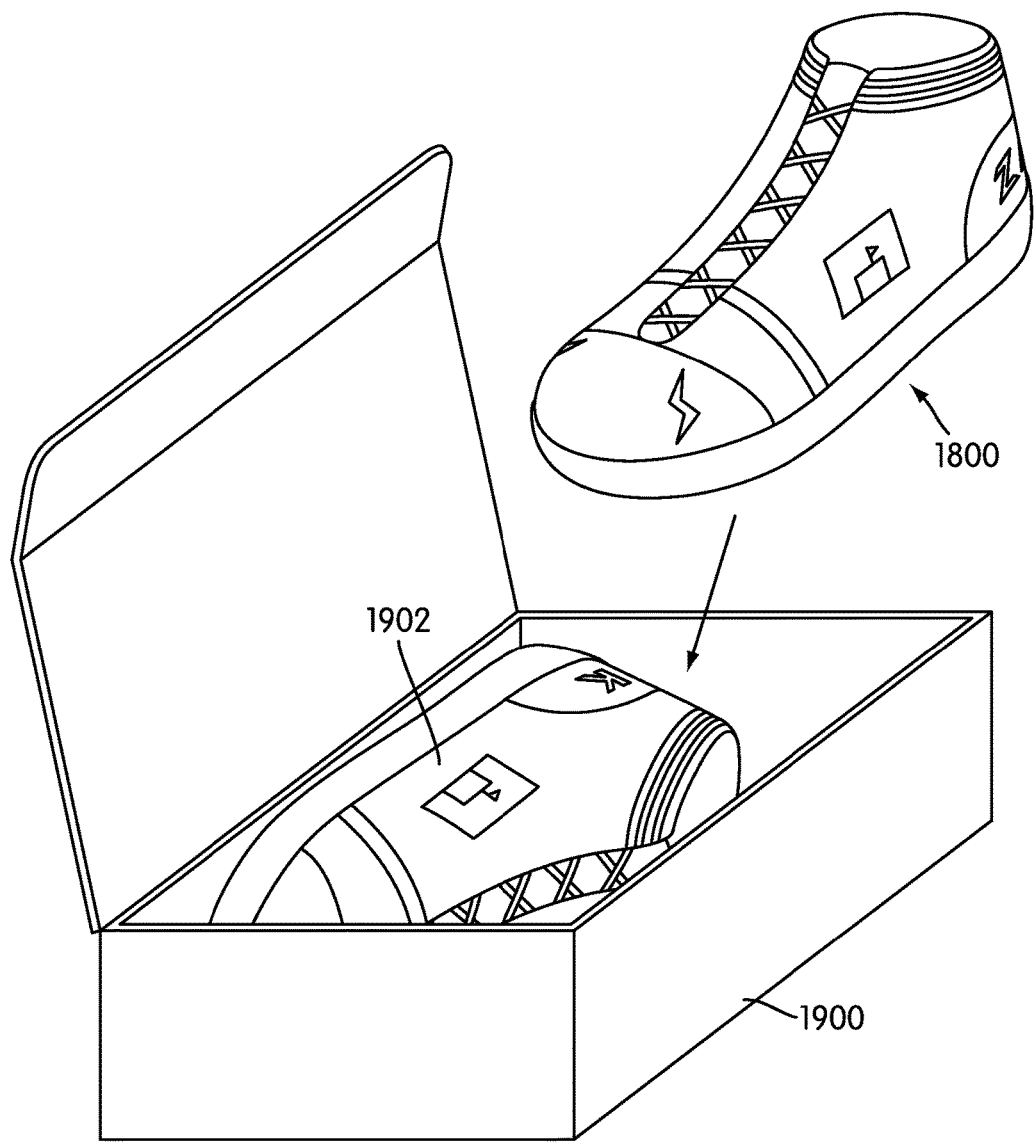
FIG. 28 is an isometric view of a preferred embodiment of an article of footwear being placed in a box for shipping.

Finally, once article of footwear 1800 has passed inspection, it may be prepared to ship to the customer. FIG. 28 is a preferred embodiment of article of footwear 1800 being placed inside shipping box 1900. Here, second article of footwear 1902 has already been manufactured, inspected, and placed inside shipping box 1900. At this point, articles of footwear 1800 and 1902 may be shipped to a pre-designated shipping address.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:
1. A method for producing a customized article of footwear, comprising:
displaying to a customer through a computer graphical interface system a graphical representation of the customized article of footwear;

receiving from the customer through the computer graphical interface system a designation of a custom designated image to be applied to a customized portion of the customized article of footwear;

displaying to the customer through the computer graphical interface system a graphical representation of the customized article of footwear with the custom designated image applied to the customized portion;

defining on a sheet material a two-dimensional portion corresponding to the customized portion, wherein the sheet material has a color different from the custom designated image;

applying the custom designated image to the sheet material in the two-dimensional portion and covering substantially the entire area within the two-dimensional portion with the custom designated image;

cutting the two-dimensional portion out of the sheet material to form the customized portion of the customized article of footwear; and assembling the customized portion with another portion of the customized article of footwear to form the customized article of footwear.

2. The method according to claim 1, wherein the custom designated image is a photograph.

3. The method according to claim 1, further comprising receiving the custom designated image from the customer via a network.

4. The method according to claim 3, wherein the network is the Internet.

5. The method according to claim 3, wherein the custom designated image is received from one of a digital camera and a scanner.

6. The method according to claim 1, wherein the custom designated image includes a foreground design and a background image.

7. The method according to claim 6, wherein the foreground design comprises at least one stripe.

8. The method according to claim 6, wherein the background image is applied around the foreground design in the two-dimensional portion.

9. The method according to claim 1, wherein applying the custom designated image comprises printing the custom designated image.

10. The method according to claim 1, wherein the customized portion is a first customized portion and the sheet material is a first sheet material, and wherein the method further comprises:

receiving from the customer through the computer graphical interface system a designation of a second custom designated image to be applied to a second customized portion of the customized article of footwear;

displaying to the customer through the computer graphical interface system a graphical representation of the customized article of footwear with the second custom designated image applied to the second customized portion;

defining on a second sheet material a second two-dimensional portion corresponding to the second customized portion of the customized article of footwear;

wherein the second sheet material has a color different from the second custom designated image;

applying the second custom designated image to the second sheet material in the second two-dimensional portion and covering substantially the entire area within the second two-dimensional portion with the second custom designated image;

cutting the second two-dimensional portion out of the second sheet material to form the second customized portion of the customized article of footwear; and assembling the first customized portion with the second customized portion to form the customized article of footwear.

11. The method according to claim 10, wherein the first sheet material and the second sheet material are continuous.

12. The method according to claim 1, wherein displaying to the customer through the computer graphical interface system the graphical representation of the customized article of footwear with the custom designated image applied to the customized portion, includes accounting for the three-dimensionality of a surface of the customized article of footwear.

13. A method for designing and graphically displaying a customized article of footwear to enable a user to design and order the customized article of footwear, the method comprising:

displaying a three-dimensional footwear representation;

receiving a selection of a graphics tool configured to modify a design of the three-dimensional footwear representation;

receiving via the selected graphics tool a modification of a customer selected portion of the customized article of footwear;

applying the modification to the customer selected portion of the customized article of footwear in a manner that accounts for the three-dimensionality of a surface of the customized article of footwear;

displaying the modified customer selected portion on the three-dimensional footwear representation;

receiving as a finalized design a submission of the three-dimensional footwear representation having the modified customer selected portion; and receiving an order for the customized article of footwear having the finalized design.

14. The method according to claim 13, wherein the modification comprises a photographic image applied to the customer selected portion of the customized article of footwear.

15. A computer graphical interface system for designing, graphically displaying, and receiving orders for, customized articles of footwear having custom designated images, comprising:

a computer graphical display configured to display on a remote terminal a footwear representation of a customized article of footwear; and a graphics tool configured to modify a customized portion of the footwear representation of the customized article of footwear, wherein the computer graphical interface system receives via the graphics tool a designation of a custom designated image, wherein the computer graphical interface system receives via the graphics tool an instruction to place the custom designated image on the footwear representation at the customized portion, wherein the computer graphical display modifies the footwear representation to show the custom designated image at the customized portion, wherein the computer graphical interface system receives a submission of the modified customized footwear representation, and wherein the computer graphical interface system receives an order for the customized article of footwear corresponding to the modified customized footwear representation.

16. The system according to claim 15, wherein the custom designated image is a photograph.

17. The system according to claim 16, wherein the custom designated image is from one of a digital camera and a scanner.

18. The system according to claim 15, further comprising the remote terminal,
wherein the remote terminal comprises a display and a processor, and is configured to transmit and receive data through a communications network.

19. The system according to claim 18, wherein the remote terminal comprises one of a personal digital assistant and a cellular telephone.

20. The system according to claim 15, further comprising a database containing pre-designed images,
wherein the graphical interface system is configured to retrieve the pre-designed images, display the pre-designed images via the computer graphical display, and receive via the graphics tool a selection of a pre-designed image from among the displayed pre-designed images, and
wherein the selected pre-designed image is the custom designated image.

* * * * *